(12) United States Patent
Lee et al.

(10) Patent No.: US 10,516,550 B2
(45) Date of Patent: Dec. 24, 2019

(54) TRAFFIC ENGINEERING SERVICE MAPPING

(71) Applicant: Futurewei Technologies, Inc., Plano, TX (US)

(72) Inventors: Young Lee, Plano, TX (US); Dhruv Dhody, Bangalore (IN); Haomian Zheng, Shenzhen (CN); Ricard Vilalta, Barcelona (ES)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 15/905,558

(22) Filed: Feb. 26, 2018

(65) Prior Publication Data

US 2018/0262365 A1  Sep. 13, 2018

Related U.S. Application Data

(60) Provisional application No. 62/464,198, filed on Feb. 27, 2017.

(51) Int. Cl.
| | |
|---|---|
| *H04L 12/46* | (2006.01) |
| *H04L 29/06* | (2006.01) |
| *H04L 12/24* | (2006.01) |
| *H04L 12/715* | (2013.01) |

(52) U.S. Cl.
CPC ...... *H04L 12/4675* (2013.01); *H04L 12/4633* (2013.01); *H04L 41/5045* (2013.01); *H04L 41/5054* (2013.01); *H04L 63/0272* (2013.01); *H04L 41/044* (2013.01); *H04L 41/0803* (2013.01); *H04L 41/5077* (2013.01); *H04L 45/04* (2013.01)

(58) Field of Classification Search
CPC ............. H04L 12/4675; H04L 12/4633; H04L 41/5045; H04L 41/5054; H04L 63/0272; H04L 41/044; H04L 41/0803; H04L 41/5077; H04L 45/04
See application file for complete search history.

(56) References Cited

U.S. PATENT DOCUMENTS

| | | | |
|---|---|---|---|
| 10,027,587 B1* | 7/2018 | O'Brien | ................ H04L 45/745 |
| 2015/0263867 A1 | 9/2015 | Chen et al. | |
| 2016/0119189 A1 | 4/2016 | Choi et al. | |

(Continued)

FOREIGN PATENT DOCUMENTS

CN  106464587 A  2/2017

OTHER PUBLICATIONS

Foreign Communication From A Counterpart Application, PCT Application No. PCT/CN2018/077358, English Translation of International Search Report dated Jun. 4, 2018, 5 pages.

(Continued)

*Primary Examiner* — Duc C Ho
(74) *Attorney, Agent, or Firm* — Conley Rose, P.C.

(57) ABSTRACT

A CNC includes a processor configured to import a VPN-specific service model for a VPN service and map the VPN-specific service model to one or more TE-specific parameters. The CNC includes a memory coupled to the processor and configured to store a mapping between a VPN ID of the VPN service and a tunnel ID of a TE tunnel established for the VPN service. The TE tunnel satisfies the one or more TE-specific parameters.

23 Claims, 13 Drawing Sheets

(56) References Cited

U.S. PATENT DOCUMENTS

2016/0134591 A1* 5/2016 Liao .................. H04L 12/6418
726/15
2016/0337175 A1 11/2016 Rao
2017/0026417 A1* 1/2017 Ermagan ............ H04L 12/4641

OTHER PUBLICATIONS

Foreign Communication From A Counterpart Application, PCT Application No. PCT/CN2018/077358, English Translation of Written Opinion dated Jun. 4, 2018, 4 pages.
Bierman, et al., "RESTCONF Protocol," draft-ietf-netconf-restconf-18, Oct. 27, 2016, 133 pages.
Bjorklund, Ed., "YANG—A Data Modeling Language for the Network Configuration Protocol (NETCONF)," RFC 6020, Oct. 2010, 173 pages.
Bogdanovic, et al., "YANG Module Classification," draft-ietf-netmod-yang-model-classification-04, Oct. 26, 2016, 11 pages.
Callon, et al., "A Framework for Layer 3 Provider-Provisioned Virtual Private Networks (PPVPNs)," RFC 4110, Jul. 2005, 82 pages.
Ceccarelli, Ed., et al., "Framework for Abstraction and Control of Traffic Engineered Networks," draft-ietf-teas-actn-framework-04, Feb. 16, 2017, 35 pages.
Dhody, et al., "Applicability of Path Computation Element (PCE) for Abstraction and Control of TE Networks (ACTN)," draft-dhody-pce-applicability-actn-01, Oct. 19, 2016, 15 pages.
Lee, et al., "Traffic Engineering and Service Mapping Yang Model," draft-lee-teas-te-service-mapping-yang-00, Mar. 9, 2017, 18 pages.
Lee, et al., "Traffic Engineering and Service Mapping Yang Model," draft-lee-teas-te-service-mapping-yang-04, Oct. 30, 2017, 18 pages.
Enns, Ed., et al., "Network Configuration Protocol (NETCONF)," RFC 6241, Jun. 2011, 113 pages.
Lee, Ed., et al., "Yang Data Model for ACTN VN Operation," draft-lee-teas-actn-vn-yang-02, Oct. 29, 2016, 26 pages.
Litkowski, et al., "YANG Data Model for L3VPN service delivery," draft-ietf-l3sm-l3vpn-service-model-19, Nov. 4, 2016, 161 pages.
Liu, et al., "YANG Data Model for TE Topologies," draft-ietf-teas-yang-te-topo-06, Oct. 28, 2016, 100 pages.
Saad, Ed., et al., "A YANG Data Model for Traffic Engineering Tunnels and Interfaces," draft-ietf-teas-yang-te-05, Oct. 26, 2016, 110 pages.
Wu, et al., "Service Models Explained," draft-wu-opsawg-service-model-explained-05, Jan. 5, 2017, 20 pages.
Wen, et al., "A YANG Data Model for L2VPN Service Delivery," draft-ietf-l2sm-l2vpn-service-model-05, Jan. 15, 2018, 149 pages.
Fioccola, et al., "A Yang Data Model for L1 Connectivity Service Model (L1CSM)," draft-fioccola-ccamp-l1csm-yang-00, Oct. 27, 2017, 22 pages.
Vasseur, JP, Ed., et al., "Path Computation Element (PCE) Communication Protocol (PCEP)," RFC 5440, Mar. 2009, 87 pages.
Bierman, A., et al., "RESTCONF Protocol," RFC 8040, Jan. 2017, 137 pages.
Yasukawa, S., "PCC-PCE Communication Requirements for VPNs," draft-yasukawa-pce-vpn-req-01.txt, XP015047343, Network Working Group, Sep. 2006, 16 pages
Lee, Y., et al.," Information Model for Abstraction and Control of TE Networks (ACTN)," draft-leebelotti-teas-actn-info-05.txt, XP015116001, Oct. 24, 2016, 28 pages.
Lee, Y., (Editor), et al.," A Yang Data Model for ACTN VN Operation," draft-lee-teas-actn-vn-yang-02, XP015116438, TEAS Working Group, Oct. 29, 2016, 26 pages.
Lee, Y., et al.,"Applicability of YANG models for Abstraction and Control of Traffic Engineered Networks," XP015116528, draft-zhang-teas-actn-yang-03, Internet Draft, Oct. 31, 2016, 20 pages.
Lee, Y., et al., "Traffic Engineering and Service Mapping Yang Model," XP015124663, draft-lee-teas-te-service-mapping-yang-02, TEAS WG, Internet Draft, Oct. 27, 2017, 20 pages.
Foreign Communication From a Counterpart Application, European Application No. 18758203.6, Extended European Search Report dated Oct. 25, 2019, 13 pages.

* cited by examiner

| VPN ID 401 | TE Tunnel ID 402 | Parameter 403 | | Service Mapping Policy 404 |
|---|---|---|---|---|
| | | Latency Level 405 | Path Protection Level 406 | |
| A | D | <50ms | 1+1 | Sharing Allowed |
| B | E | <50ms | 1:0 | Sharing Allowed |
| C | F | N/A | 1+1 | Sharing Not Allowed |

450A, 450B, 450C — rows of table 400

```
module: ietf-te-service-mapping
  +--rw te-service-mapping
    +--rw service-mapping
    | +--rw mapping-list* [map-id]
    |   +--rw map-id        uint32
    |   +--rw map-type?     map-type
    |   +--rw (service)?
    |   | +--:(l3vpn)
    |   | | +--rw l3vpn-ref?    -> /l3:l3vpn-svc/vpn-services/vpn-service/vpn-id
    |   | +--:(l2vpn)
    |   | | +--rw l2vpn-ref?    -> /l2:l2vpn-svc/vpn-services/vpn-svc/vpn-id
    |   | +--:(l1vpn)
    |   |   +--rw l1vpn-ref?    -> /l1:l1cs/service/service-list/subscriber-l1vc-id
    |   +--rw (te)?
    |     +--:(actn-vn)
    |     | +--rw actn-vn-ref?    -> /vn:actn/vn/vn-list/vn-id
    |     +--:(te)
    |       +--rw te-tunnel-list*   te:tunnel-ref
    +--rw site-mapping
      +--rw mapping-list* [map-id]
        +--rw map-id        uint32
        +--rw (service)?
        | +--:(l3vpn)
        | | +--rw l3vpn-ref?    -> /l3:l3vpn-svc/sites/site/site-id
        | +--:(l2vpn)
        | | +--rw l2vpn-ref?    -> /l2:l2vpn-svc/sites/site/site-id
        | +--:(l1vpn)
        |   +--rw l1vpn-ref?    -> /l1:l1cs/access/uni-list/UNI-ID
        +--rw (te)?
          +--:(actn-vn)
          | +--rw actn-vn-ref?    -> /vn:actn/ap/access-point-list/access-point-id
          +--:(te)
```

FIG. 8

900 

```
+--ro te-service-mapping-state
   +--ro service-mapping
   |  +--ro mapping-list* [map-id]
   |     +--ro map-id        uint32
   |     +--ro map-type?     map-type
   |     +--ro (service)?
   |     |  +--:(l3vpn)
   |     |  |  +--ro l3vpn-ref?    -> /l3:l3vpn-svc/vpn-services/vpn-service/vpn-id
   |     |  +--:(l2vpn)
   |     |     +--ro l2vpn-ref?    -> /l2:l2vpn-svc/vpn-services/vpn-svc/vpn-id
   |     +--ro (te)?
   |        +--:(actn-vn)
   |        |  +--ro actn-vn-ref?   -> /vn:actn/vn/vn-list/vn-id
   |        +--:(te)
   |           +--ro te-tunnel-list*   te:tunnel-ref
   +--ro site-mapping
   |  +--ro mapping-list* [map-id]
   |     +--ro map-id        uint32
   |     +--ro (service)?
   |     |  +--:(l3vpn)
   |     |  |  +--ro l3vpn-ref?    -> /l3:l3vpn-svc/sites/site/site-id
   |     |  +--:(l2vpn)
   |     |     +--ro l2vpn-ref?    -> /l2:l2vpn-svc/sites/site/site-id
   |     +--ro (te)?
   |        +--:(actn-vn)
   |        |  +--ro actn-vn-ref?   -> /vn:actn/ap/access-point-list/access-point-id
   |        +--:(te)
```

FIG. 9

TRAFFIC ENGINEERING SERVICE MAPPING

CROSS-REFERENCE TO RELATED APPLICATION

This application claims priority to U.S. provisional patent application No. 62/464,198 filed on Feb. 27, 2017 by Futurewei Technologies, Inc. and titled "Traffic Engineering (TE) Service Mapping," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Software defined network (SDN) is a networking paradigm that decouples network control and forwarding functions. The decoupling of the control plane from the data plane allows for centralization of network control, enabling effective policy administration and flexible management. The centralization of network control facilitates various network functionalities, such as network measurements, traffic engineering, enhanced quality of services, and enhanced access control. With the growing availability of SDN-enabled nodes and protocols, many organizations have started deploying SDN networks.

A virtual private network (VPN) extends a private network across a public network, and enables users to send and receive data across shared or public networks as if their computing devices were directly connected to the private network. Users may request a VPN using a VPN-specific service model.

SUMMARY

According to one aspect of the present disclosure, there is provided a customer network controller (CNC) that includes a processor configured to import a VPN-specific service model for a VPN service and map the VPN-specific service model to one or more traffic engineering (TE)-specific parameters. The CNC according to this aspect of the present disclosure additionally includes a memory coupled to the processor and configured to store a mapping between a VPN identification (ID) of the VPN service and a tunnel ID of a TE tunnel established for the VPN service, where the TE tunnel satisfies the one or more TE-specific parameters.

Optionally, in any of the preceding aspects, the VPN-specific service model includes a layer three (L3) service model (SM).

Optionally, in any of the preceding aspects, the one or more TE-specific parameters are parameters used in an abstraction and control of traffic engineered networks (ACTN) virtual network (VN) yet another next generation (YANG) model.

Optionally, in any of the preceding aspects, the one or more TE-specific parameters are parameters used in a TE tunnel model.

Optionally, in any of the preceding aspects, the processor is further configured to map the VPN service to a service mapping policy that indicates whether TE tunnel sharing is allowed for the VPN service, and the CNC further includes a transmitter configured to transmit the service mapping policy to a multi-domain service coordinator (MDSC) controller.

Optionally, in any of the preceding aspects, the CNC further includes a transmitter and a receiver coupled to the processor. The transmitter is configured to send the VPN-specific service model to a MDSC controller and send the one or more TE-specific parameters to the MDSC controller. The receiver is configured to receive the TE tunnel ID from the MDSC controller.

According to another aspect of the present disclosure, there is provided a CNC that includes a processor configured to import a VPN-specific service model for a VPN service and map the VPN-specific service model to a service mapping policy that indicates whether TE tunnel sharing is allowed for the VPN service. The CNC also includes a memory coupled to the processor and configured to store a mapping between a VPN ID of the VPN service and a tunnel ID of a TE tunnel established for the VPN service according to the service mapping policy.

Optionally, in any of the preceding aspects, the CNC additionally includes a transmitter and a receiver coupled to the processor. The transmitter is configured to transmit the service mapping policy to an MDSC controller. The receiver is configured to receive the TE tunnel ID from the MDSC controller.

Optionally, in any of the preceding aspects, the VPN-specific service model is an L3 SM.

Optionally, in any of the preceding aspects, the service mapping policy is selected from a plurality of modes including a first mode that requires a new TE tunnel that is not shared with any existing VPN services, a second mode that allows use of an existing TE tunnel that is shared with an existing VPN service and that does not allow for modification of the existing TE tunnel, and a third mode that allows for use of an existing tunnel that is shared with an existing VPN service and that allows for modification of the existing TE tunnel.

According to another aspect of the present disclosure, a central controller includes a receiver and a processor coupled to the receiver. The receiver is configured to receive a VPN-specific service model specifying one or more attributes for a VPN service. The processor is configured to obtain a mapping between the VPN-specific service model and one or more TE-specific parameters corresponding to the one or more attributes, determine, using the mapping, a TE tunnel that satisfies the one or more TE-specific parameters, map the VPN service to the TE tunnel.

Optionally, in any of the preceding aspects, the VPN-specific service model is an L3 SM.

Optionally, in any of the preceding aspects, the one or more TE-specific parameters are associated with an ACTN VN YANG model.

Optionally, in any of the preceding aspects, the mapping further indicates a service mapping policy for the VPN service, wherein the service mapping policy indicates whether the TE tunnel is allowed to be shared with an existing VPN service, and wherein the processor is further configured to set up the TE tunnel according to the service mapping policy.

Optionally, in any of the preceding aspects, the central controller further includes a transmitter coupled to the processor. The processor is configured to interact with one or more packet provisioning network controllers (PNCs) and one or more transport PNCs via the receiver and the transmitter to create, in an IP/MPLS network, a provider edge (PE)-PE tunnel that is mapped to the TE tunnel in a transport network.

Optionally, in any of the preceding aspects, the processor is configured to cause the transmitter to transmit inter-layer access points and tunnel requirements to the one or more IP controllers and the one or more transport network controllers.

Optionally, in any of the preceding aspects, the processor is configured to cause the transmitter to send a TE model that is based on the VPN-specific service model to the one or more IP controllers, wherein the TE model specifies the one or more TE-specific parameters.

Optionally, in any of the preceding aspects, the central controller further includes a memory coupled to the processor and configured to store a relation between a TE tunnel ID to an ID of the VPN service in a data structure.

According to another aspect of the present disclosure, a central controller includes a receiver and a processor coupled to the receiver. The receiver is configured to receive a VPN-specific service model for a VPN service and a service mapping policy for the VPN service, wherein the service mapping policy indicates whether TE tunnel sharing is allowed for the VPN service. The processor is configured to determine, according to the service mapping policy, a TE tunnel for the VPN service and map the VPN service to the TE tunnel.

Optionally, in any of the preceding aspects, the service mapping policy is selected from a plurality of modes including a first mode that requires a new TE tunnel that is not shared with any existing VPN services, a second mode that allows use of an existing TE tunnel that is shared with an existing VPN service and that does not allow for modification of the existing TE tunnel, and a third mode that allows for use of an existing tunnel that is shared with an existing VPN service and that allows for modification of the existing TE tunnel.

Optionally, in any of the preceding aspects, the VPN-specific service model is a L3 SM.

Optionally, in any of the preceding aspects, the VPN-specific service model specifies attributes for the VPN service, wherein the service mapping policy indicates that TE tunnel sharing is allowed for the VPN service, and wherein the processor is further configured to search TE tunnel assignments to determine whether any established TE tunnels allow sharing and satisfy the attributes.

Optionally, in any of the preceding aspects, the central controller further includes a transmitter coupled to the processor. Responsive to determining that no established TE tunnels allow sharing and satisfy the attributes, the processor is configured to interact, via the receiver and the transmitter, with one or more PNCs using a TE tunnel model.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is a table illustrating examples of tunnel assignments for VPN services having different service policies and corresponding values.

FIG. 8 is a read-write YANG data model defining how VPN-specific service models are mapped to service mapping policies and TE tunnels at the CNC or the central controller.

FIG. 9 is a read-only YANG data model defining how VPN-specific service models are mapped to service mapping policies and TE tunnels at the CNC or the central controller.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalent.

Users of VPNs may desire to have network resource guarantees. However, a VPN that is set up using a layer one (L1), layer 2 (L2), or L3 VPN service model is typically established only based on a best effort and resources are not guaranteed. A TE tunnel model may be used to setup a TE tunnel that guarantees resources. However, current VPN networks do not have a mechanism by which to map a L1, L2, or L3 VPN SM (e.g., TE constraints expressed in the L1, L2, or L3 SM) to an ACTN VN model or a TE tunnel model to setup a TE tunnel. Disclosed herein are embodiments directed to mapping a VPN-specific service model to an ACTN VN SM or a TE tunnel model to set up a TE tunnel (e.g., using a TE tunnel model).

Figure 1:
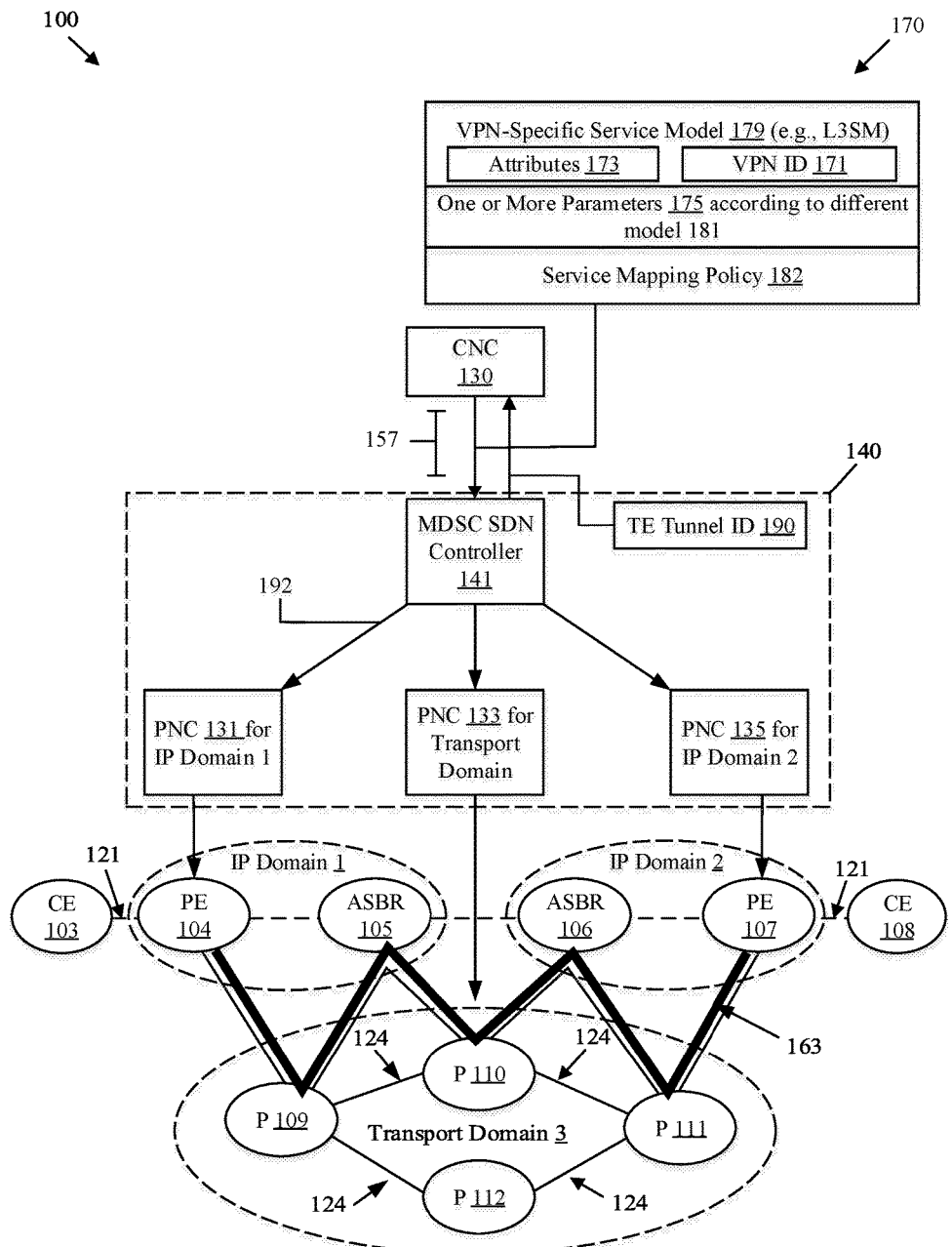
FIG. 1 is a schematic diagram of a network according to an embodiment of the disclosure.

FIG. 1 is a schematic diagram of a network 100 according to an embodiment of the disclosure. In various embodiments, network 100 may implement SDN, VPN, Layer 1 VPN Service Model (L1SM), Layer 2 VPN Service Model (L2SM), Layer 3 VPN Service Model (L3SM), ACTN, a TE tunnel model, a YANG data model, a Representational State Transfer Configuration (RESTCONF) protocol, a Network Configuration (NETCONF) protocol, a Path Computation Element Communication Protocol (PCEP), or a combination thereof. L2SM may be implemented according to the L2SM as described in Internet Engineering Task Force (IETF) document entitled, "A YANG Data Model for L2VPN Service Delivery," version 3, dated Sep. 18, 2017 (referred to herein as the L2SM document), which is hereby incorporated by reference in its entirety. L3SM may be implemented according to the L3SM as described in IETF document entitled, "YANG Data Model for L3VPN Service Delivery," version 11, dated Jan. 17, 2018 (referred to herein as the L3SM document), which is hereby incorporated by reference in its entirety. ACTN may be implemented as defined by IETF document entitled "A YANG Data Model for ACTN VN Operation," version 7, dated Oct. 23, 2017 (referred to as ACTN VN YANG document), which is hereby incorporated by reference in its entirety. The TE tunnel model may be implemented as defined in IETF document "A YANG Data Model for Traffic Engineering Tunnels and Interfaces," dated Oct. 26, 2016 (referred to herein as the TE tunnel model document), which is hereby incorporated by reference in its entirety. The YANG data model is implemented as defined by IETF Request for Comments (RFC) 6020 document entitled, "YANG—A Data Modeling Language for the Network Configuration Protocol (NETCONF)," published October 2010, which is hereby incorporated by reference in its entirety. The NETCONF protocol is implemented as defined by IETF RFC 6241 document entitled "Network Configuration Protocol (NETCONF)," dated June 2011, which is hereby incorporated by reference in its entirety. The RESTCONF protocol is implemented as defined by IETF RFC 8040 document entitled, "RESTCONF protocol," dated January 2017, which is hereby incorporated by reference in its entirety. PCEP is implemented as defined by IETF RFC 5440 document entitled, "Path Computation Element (PCE) Communication Protocol (PCEP)," dated March 2009, which is hereby incorporated by reference in its entirety. The underlying infrastructure of the network 100 may be any type of network such as a wired or wireless network, an optical network, or combinations thereof. In an embodiment, the network 100 employs multiple domains, such as one or more internet protocol (IP) domains and one or more transport domains.

The network 100 comprises customer edges (CEs) 103 and 108, nodes 104, 105, 106, 107, 109, 110, 111, and 112, CNC 130, and a central controller 140. The CEs 103 and 108 are network devices located at customer sites external to the network 100. For example, CEs 103 and 108 may be routers, bridges, switches, or hosts. The CEs 103 and 108 may originate and/or terminate customer traffic.

In some embodiments, CEs 103 and 108 are dedicated to a particular customer and connected to nodes 104 and 107, respectively, by links 121. Nodes 104, 105, 106, 107, 109, 110, 111, and 112 are also interconnected to each other by links 124. The links 121 and 124 may comprise physical links such as fiber optic links, electrical links, wireless links, and logical links used to transport data in the network 100. The nodes 104, 105, 106, 107, 109, 110, 111, and 112 are any devices or components such as routers and switches configured to perform both multiprotocol label switching (MPLS) signaling to establish Label-Switched Paths (LSPs) and tunnels in the network 100 and data forwarding along the established LSPs and tunnels.

A node that receives traffic from a CE is referred to as an ingress provider edge (PE) node, and a node that sends traffic to a CE is referred to as an egress PE node. In some embodiments, nodes 104 and 107 are PE nodes and may be referred to as ingress PE node 104 and egress PE node 107.

For example, ingress PE node 104 may be a PE node 104 located at the edge of network 100 that directs traffic to and from CE 103. Similarly, egress PE node 107 may be a PE node 107 located at the edge of network 100 that directs traffic to and from CE 108. In some embodiments, PE nodes 104 and 107 may connect to one or more nodes outside of the network 100. In some embodiments, network 100 may comprise area border routers (ASBRs) located between borders of multiple domains when network 100 includes multiple domains (e.g., IP domain 1, IP domain 2, and Transport Domain 3). For example, the nodes 105, 106 may be ASBRs. Nodes 109, 110, 111, and 112 that are located internally within one or more domains of network 100 are referred to as internal nodes. Each of nodes 109, 110, 111, 112 forwards traffic within a corresponding domain of network 100. While only four nodes 109, 110, 111, 112 are shown in network 100, any number of nodes may be included in network 100.

In some embodiments, the PE nodes 104 and 107 are managed by a service provider that can support multiple VPNs for different customers. A service provider is an organization responsible for operating the network 100 that offers VPN services to clients and customers. The PE nodes 104 and 107 may be located at a service provider point of presence and may be managed by the service provider.

The CNC 130 is a controller device configured to communicate with CEs 103 and 108 and obtain VPN information. The VPN information includes a request for a VPN service and is expressed using a VPN-specific SM 179. A VPN-specific SM 179 is a model according to which a request (e.g., that includes one or more attributes) for a VPN service is expressed. A VPN SM 179 for a VPN service (e.g., a requested VPN service) is or includes a request for a VPN service expressed according to the VPN-specific SM 179. For example, the VPN-specific SM 179 may correspond to the L2SM as described in the L2SM document, which is hereby incorporated by reference in its entirety. When the VPN-specific SM 179 corresponds to the L2SM, the VPN-specific SM 179 for a VPN service (e.g., for a requested VPN service) is or includes a VPN service request expressed using the L2SM (e.g., according to the L2SM document). As another example, the VPN-specific SM 179 may correspond to the L3SM as described in the L3SM document, which is hereby incorporated by reference in its entirety. When the VPN-specific SM 179 corresponds to the L3SM, the VPN-specific SM 179 for a VPN service (e.g., for a requested VPN service) is or includes a VPN service request expressed using the L3SM (e.g., according to the L3SM document). As examples, in some embodiments, the attributes 173 include Quality of Service (QoS) or bandwidth.

When network 100 is a multi-domain network, as is illustrated in FIG. 1, then the central controller 140 includes a MDSC controller 141 (e.g., MDSC SDN controller) connected between the CNC 130 and multiple PNCs 131, 133, 135 or domain controllers that are associated with respective domains 1, 2, and 3. The MDSC controller 141 or super controller and the PNCs 131, 133, 135 or domain controllers can be collocated or the MDSC controller 141 or super controller and the PNCs 131, 133, 135 or domain controllers may be located separately. The MDSC controller 141 or super controller is configured to coordinate functions performed by network 100 at each of CEs 103 and 108. As an example, the MDSC controller 141 is responsible for coordinating an L3VPN service request expressed in L3SM with the IP PNC(s) (e.g., PNCs 131 and 135, also referred to as packet PNCs) and the transport PNC(s) (e.g., PNC 133). In particular, the MDSC controller 141 is configured to coordinate with the IP PNC(s) and the transport PNC(s) to map the L3SM and ACTN VN/TE tunnel models.

The PNCs 131, 133, 135 or domain controllers configure the nodes 104, 105, 106, 107, 109, 110, 111, and 112 in network 100 and monitor physical topology of network 100. The PNCs 131, 133, 135 or domain controllers may be configured to communicate the physical topology of network 100 to the MDSC controller 141 or super controller. The IP PNC(s) (e.g., PNCs 131 and 135) are responsible for device configuration to create PE-PE L3VPN tunnels for the VPN customer and for the configuration of the L3VPN VPN routing and forwarding (VRF) on the PE nodes. The transport PNC(s) (e.g., PNC 133) are responsible for device configuration for TE tunnels in the transport networks. Although FIG. 1 illustrates a multi-domain network, embodiments may be used in a single-domain network, in which case the central controller 140 does not include an MDSC SDN controller.

The MDSC controller 141 or super controller and PNCs 131, 133, 135 or domain controllers of network 100 together control the nodes 104, 105, 106, 107, 109, 110, 111, and 112 based on the customer's requests that are received by the CNC 130. The CNC 130 interfaces with the MDSC controller 141 or super controller over a CNC/MDSC interface (CMI) interface 157, and the MDSC controller 141 interfaces with the nodes 104, 105, 106, 107, 109, 110, 111, and 112 over a southbound interface. As should be appreciated, any number of CNCs, MDSCs, super controllers, PNCs, and domain controllers may be included in network 100.

The network 100 is configured to provide TE tunnels for carrying traffic from the CE 103 to the CE 108. A method for tunneling may comprise encapsulating original packets using an encapsulation protocol and sending the encapsulated packet from an ingress PE node 104 to an egress PE node 107. The egress PE node 107 decapsulates the encapsulated packet to remove headers that were encapsulated onto the packets by the ingress PE node 104 and forwards the original packet to a CE 108. As a result, tunneled packets are transported as normal IP packets over the network 100, where the outer IP source address is an ingress PE node 104 address and the outer IP destination address is an egress PE node 107 address. Tunnel mechanisms enable users or third parties to establish a private network over the Internet or without the infrastructure network awareness.

A customer of a VPN service may desire to have certain service constraints (e.g., TE constraints) guaranteed for the VPN service. However, current VPN networks are unable to establish a TE tunnel that satisfies the desired network properties expressed in a VPN-specific service model because current VPN networks cannot translate or map the attributes specified in the VPN-specific SM 179 into a format that the central controller 140 can use to setup a TE tunnel 163.

Disclosed herein are embodiments directed to setting up a TE tunnel 163 for a VPN service that satisfies one or more attributes 173 that are expressed using the VPN-specific SM 179. The one or more attributes 173 may correspond to TE constraints (e.g., properties or attributes used to instantiate a TE tunnel) expressed using the VPN-specific SM 179. The embodiments use a TE service mapping model to translate and/or map the one or more attributes 173 expressed using the VPN-specific SM 179 to one or more TE-specific parameters 175 of a TE tunnel-model or an intermediate model (e.g., ACTN VN YANG model). Parameters used in a TE tunnel model (e.g., as described in the TE tunnel model document) and/or an ACTN VN YANG model (e.g., as described in the ACTN VN YANG document) are referred to herein as TE-specific parameters. In some embodiments, the TE tunnel is additionally setup according to a service mapping policy specified for the VPN service.

In an embodiment, the CNC 130 obtains the VPN-specific SM 179 that includes the one or more attributes 173 associated with a VPN service requested by a customer. The CNC 130 may also obtain a service mapping policy 182 associated with the VPN service. The CNC 130 sends a request 170 to the central controller 140 to cause the central controller 140 to set up a TE tunnel for the VPN service. The request 170 includes at least the VPN-specific SM 179, one or more TE-specific parameters 175, and a service mapping policy 182.

The one or more TE-specific parameters 175 map to the one or more attributes 173 for the VPN service expressed using the VPN-specific SM 179. The CNC 130 is configured to determine the one or more TE-specific parameters 175 using a TE service mapping model (e.g., the TE service mapping model 202 of FIG. 2 or 7) to translate and/or map the one or more attributes 173 expressed using the VPN-specific SM 179 to the one or more TE-specific parameters 175 of the different model 181 from which the MDSC controller 141 can generate a TE tunnel. For example, the different model 181 may correspond to the ACTN VN YANG model as described in the ACTN VN YANG document. In this example, the CNC 130 uses the TE service mapping model to translate or map the one or more attributes 173 included in and expressed using the VPN-specific SM 179 to the one or more TE-specific parameters 175 associated with the ACTN VN YANG model. As another example, the different model 181 may correspond to a TE tunnel model as described in the TE tunnel model document. While FIG. 1 illustrates the request 170 as including the one or more TE-specific parameters 175, in other examples, the request 170 does not include the one or more TE-specific parameters 175, and the MDSC controller 141 determines the one or more TE-specific parameters 175. For example, the CNC 130 may send the request 170 including the VPN-specific SM 179, and the MDSC controller 141 may use the TE service mapping model to translate or map the one or more attributes 173 expressed using the VPN-specific SM 179 to the one or more TE-specific parameters 175 as used in a TE tunnel model as specified in the TE tunnel model document.

The CNC 130 or MDSC controller 141 may map the VPN-specific SM 179 to the one or more TE-specific parameters 175 by relating the one or more TE-specific parameters 175 to the VPN service (e.g., via a VPN service ID) in a data structure. Thus, in this manner, the CNC 130 or the MDSC controller 141 may map the VPN-specific SM 179 to the one or more TE-specific parameters 175 (e.g., may map the VPN-specific SM 179 to the ACTN VN YANG model or to a TE tunnel model). The CNC 130 or the MDSC controller 141 may store the one or more TE-specific parameters 175 in a memory of the CNC 130 or the MDSC controller 141.

The service mapping policy 182 may specify one or more modes associated with TE tunnel isolation, TE tunnel sharing, or TE tunnel property modification. For example, the service mapping policy 182 may specify a first mode that requires complete TE tunnel isolation. In response to the service mapping policy 182 specifying the first mode, the MDSC controller 141 may be configured to generate a new TE tunnel. The service mapping policy 182, e.g., the first mode, enables creation of dynamic VN/TE tunnels for customers who require network slices operated from other VPNs for QoS or other reasons. Additionally or alternatively, the service mapping policy 182 may specify a second mode that allows for use of an existing TE tunnel. In these examples, the MDSC controller 141 may interact with the PNCs 131, 133, 135 to determine if an existing TE tunnel satisfies the one or more TE-specific parameters 175. When an existing TE tunnel satisfies the one or more TE-specific parameters 175, the MDSC controller 141 may assign the VPN service to the existing TE tunnel. When an existing TE tunnel does not satisfy the one or more TE-specific parameters 175, the MDSC controller 141 may generate a new TE tunnel. Additionally or alternatively, the second mode may prohibit modification of the TE tunnel properties. In these examples, the service mapping policy 182 may specify a third mode that allows for use of an existing TE tunnel and allows modification of the properties.

The CNC 130 may map the VPN-specific SM 179 to the service mapping policy 182 by relating the service mapping policy 182 to the VPN service (e.g., via a VPN service ID) in a data structure. Thus, in this manner, the CNC 130 may map the VPN-specific SM 179 for the VPN service to the service mapping policy 182 for the VPN service.

The CNC 130 sends the request 170 including the VPN-specific SM 179, the one or more TE-specific parameters 175 (where included in the request 170), and the service mapping policy 182, to the central controller 140 (e.g., the MDSC controller 141). Responsive to receiving the request 170, the central controller 140 determines a TE tunnel for the VPN service according to the service mapping policy 182 in the request 170.

To illustrate, when the service mapping policy 182 does not allow sharing, the central controller 140 uses a TE tunnel model to send a TE tunnel setup request 192 to the PNCs 131, 133, 135. The TE tunnel setup request 192 uses a TE tunnel model to specify attributes that are used to instantiate the TE tunnel and that correspond to the one or more attributes 173. In examples in which the TE service mapping model maps the one or more attributes 173 directly to parameters of the TE tunnel model, the central controller 140 instantiates the TE tunnel model using the one or more TE-specific parameters 175 without instantiating an ACTN VN YANG model. In examples in which the TE service mapping model maps the one or more attributes 173 to parameters of the ACTN VN YANG model (e.g., an intermediate model), the MDSC controller 141 translates and maps the one or more TE-specific parameters 175 expressed using the ACTN VN YANG model into a network centric model (e.g., TE tunnel model). In these examples, the MDSC controller 141 then generates a TE tunnel setup request 192 according to the TE tunnel model. The central controller 140 and the PNCs 131, 133, 135 interact to determine a TE tunnel that satisfies the one or more TE-specific parameters 175 expressed using the TE tunnel model. The central controller 140 assigns a TE tunnel ID 190 to the created tunnel, updates a state (e.g., table) to reflect the created tunnel, and sends the TE tunnel ID 190 to the CNC 130.

When the service mapping policy 182 allows for sharing of TE tunnels, the MDSC controller 141 determines whether an existing TE tunnel can be used. In some examples, the MDSC controller 141 determines whether an existing TE tunnel can be used by searching tunnel assignments that indicate attributes and sharing policies associated with each existing TE tunnel. For example, the MDSC controller 141 may store a TE tunnel assignment data structure as described in more detail below with reference to FIG. 4, and the MDSC controller 141 may access and search the tunnel assignments for existing TE tunnels that satisfy the attributes and that allow sharing. In other examples, the MDSC controller 141 queries the PNC controllers for existing TE tunnels that satisfy the attributes and that allow sharing. When the MDSC controller 141 and/or the PNCs 131, 133, 135 determine that an existing TE tunnel satisfies the attributes 173 and allows sharing, the MDSC controller 141 updates the tunnel assignments to reflect the VPN ID 171 of the VPN service is mapped to the TE tunnel ID 190 of the TE tunnel 163 that satisfies the attributes 173 and allows sharing. The MDSC controller 141 then sends the TE tunnel ID 190 to the CNC 130. When the MDSC controller 141 determines that no existing TE tunnels satisfy the one or more TE-specific parameters 175, but that the service mapping policy 182 allows for property modification, the MDSC controller 141 determines the TE tunnel model using the one or more TE-specific parameters 175 as described above, and interacts with the PNCs 131, 133, 135 to determine if an existing TE tunnel can be modified to satisfy the one or more TE-specific parameters 175. When the PNCs 131, 133, 135 determine that an existing tunnel can be modified to satisfy the one or more TE-specific parameters 175, the existing tunnel is assigned to the VPN service. When the PNCs 131, 133, 135 determine that an existing TE tunnel cannot be modified to satisfy the one or more TE-specific parameters 175, the MDSC controller 141 interacts with the PNCs 131, 133, 135 using the TE tunnel model to create a new TE tunnel for the VPN service. When the MDSC controller 141 determines that no existing TE tunnels satisfy the one or more TE-specific parameters 175 and when property modification is not allowed, the MDSC controller 141 interacts with the PNCs to create a new TE tunnel 163 as described above.

In some examples, the MDSC controller 141 interacts with the IP PNC (e.g., the PNCs 131 and 135) and the transport PNC (e.g., the PNC 133) to create a PE-PE tunnel in the IP/MPLS network mapped to a TE tunnel in the transport network by providing the inter-layer access points and tunnel requirements (e.g., the one or more parameters 175). The specific service information is passed to the IP PNC for the actual VPN configuration and activation. The transport PNC creates the corresponding TE tunnel 163 matching with the access point and egress point. The IP PNC maps a PE-PE tunnel ID with a corresponding TE tunnel ID 190 to bind the two IDs. The MDSC controller 141 informs the IP PNC the transport tunnel identifier so that the IP PNC creates or updates a VRF instance for the VPN customer (e.g., uses the transport tunnel identifier to populate a VRF table that points to the right tunnel identifier). Thus, the network 100 may automatically bind VPNs and VRF instances to TE tunnels and provides automatic service mapping between VNs and TE tunnels, and helps operators control and manage L2 and L3 services with the visibility of underlying VNs and TE tunnels.

Figure 2:
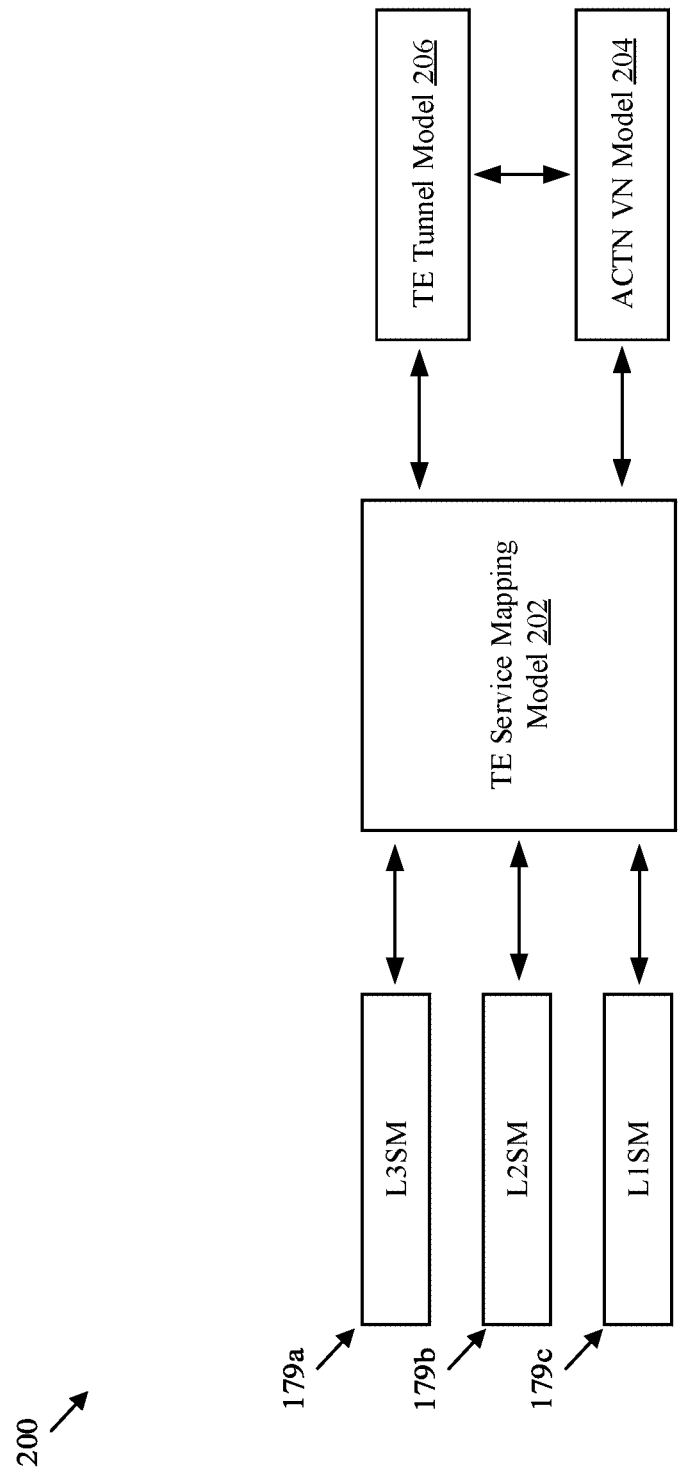
FIG. 2 is a diagram of mapping relationships according to an embodiment of the disclosure.

FIG. 2 is a diagram 200 illustrating mapping relationships according to an embodiment of the disclosure. A TE service mapping model 202 is used to map between, and/or to create a binding relationship across, a VPN-specific service model (e.g., L3SM 179a, L2SM 179b, or L1SM 179c) and a TE tunnel model 206 via a generic ACTN VN model 204. The TE service mapping model 202 may include one or more of the data models 703-705 described below with reference to FIG. 5. Additionally or alternatively, the TE service mapping model 202 may include code presented at the end of this Detailed Description. The ACTN VN YANG model 204 is a generic virtual network service model that allows internal or external customers to create a VN that meets the customer's service objective with various constraints. The TE service mapping model 202 binds a VPN-specific service model (e.g., L3SM 179a, L2SM 179b, or L1SM 179c) with TE-specific parameters (e.g., the one or more TE-specific parameters 175). That binding facilitates a seamless service operation with underlay TE network visibility.

Figure 3:
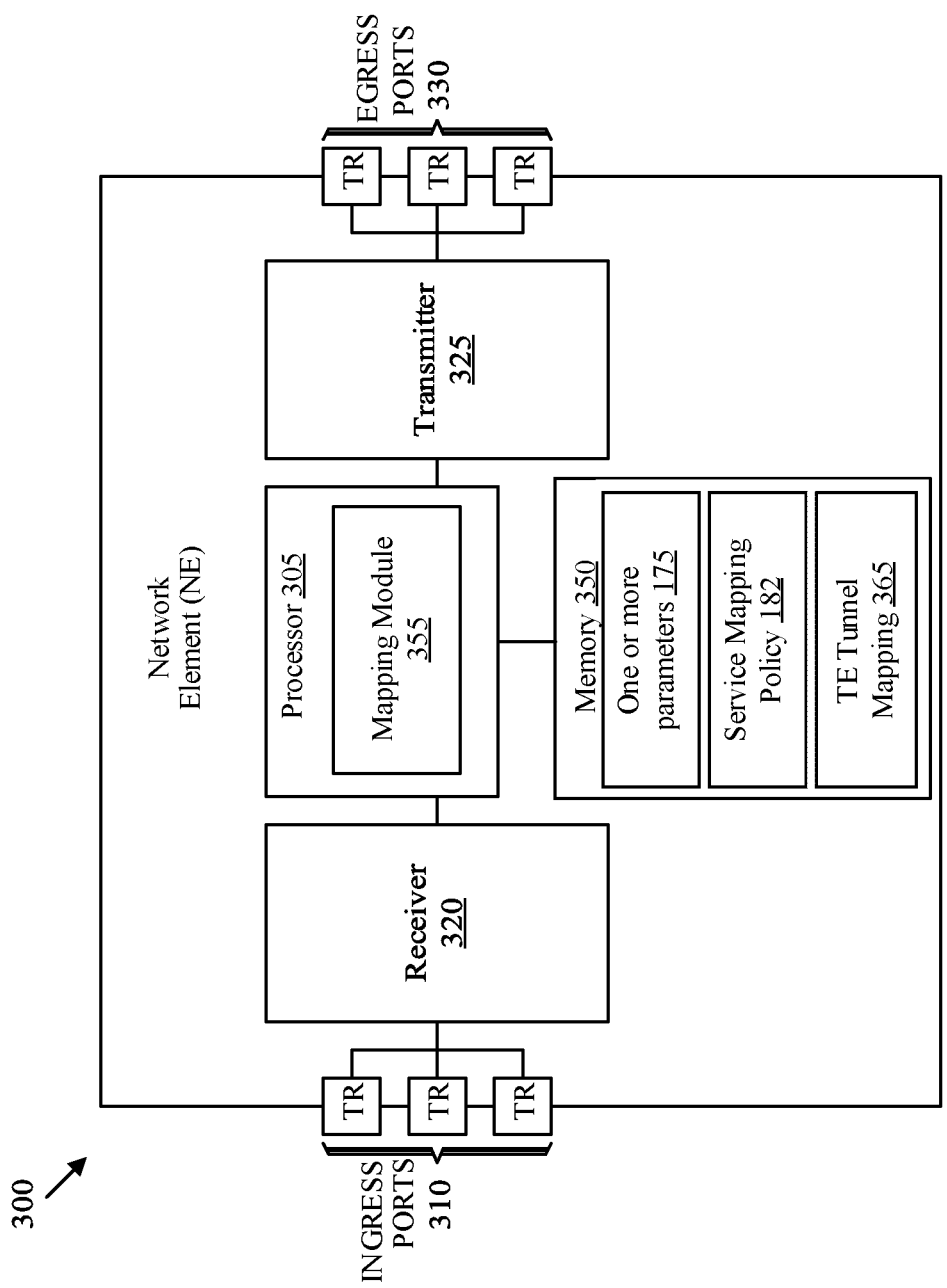
FIG. 3 is a diagram of an embodiment of a network element (NE) in the network.

FIG. 3 is a diagram of an embodiment of a NE 300 in the network 100. For instance, the NE 300 may be CNC 130 or central controller 140. The NE 300 may be configured to implement and/or support the TE service mapping mechanisms described herein. The NE 300 may be implemented in a single node or the functionality of NE 300 may be implemented in a plurality of nodes. One skilled in the art will recognize that the term NE encompasses a broad range of devices of which NE 300 is merely an example. The NE 300 is included for purposes of clarity of discussion, but is in no way meant to limit the application of the present disclosure to a particular NE embodiment or class of NE embodiments. At least some of the features and/or methods described in the disclosure may be implemented in a network apparatus or module such as an NE 300. For instance, the features and/or methods in the disclosure may be implemented using hardware, firmware, and/or software installed to run on hardware. As shown in FIG. 3, the NE 300 comprises one or more ingress ports 310 and a receiver unit (Rx) 320 for receiving data, at least one processor, logic unit, or central processing unit (CPU) 305 to process the data, a transmitter unit (Tx) 325 and one or more egress ports 330 for transmitting the data, and a memory 350 for storing the data.

The processor 305 may comprise one or more multi-core processors and be coupled to a memory 350, which may function as data stores, buffers, etc. The processor 305 may be implemented as a general processor or may be part of one or more application specific integrated circuits (ASICs) and/or digital signal processors (DSPs). The processor 305 may comprise a mapping module 355, which may perform processing functions of the CNC 130 or the central controller 140, and implement methods 500, 600, 700, 1000, 1100, 1200, and 1300 as discussed more fully below, and/or any other method discussed herein. As such, the inclusion of the mapping module 355 and associated methods and systems provide improvements to the functionality of the NE 300. Further, the mapping module 355 effects a transformation of a particular article (e.g., the network) to a different state. In an alternative embodiment, mapping module 355 may be implemented as instructions stored in the memory 350, which may be executed by the processor 305.

The memory 350 may comprise a cache for temporarily storing content, e.g., a random-access memory (RAM). Additionally, the memory 350 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory 350 may be configured to store routing databases. In an embodiment, the memory 350 may comprise the one or more TE-specific parameters 175, the service mapping policy 182, and TE tunnel mapping 365. The TE tunnel mapping 365 may include a TE tunnel ID 190 corresponding to the TE tunnel 163 created for the VPN service. While FIG. 3 illustrates the tunnel mapping 365 as a separate block from the one or more TE-specific parameters 175 and the service mapping policy 182, the TE tunnel mapping 365 may be stored using the same data model as the one or more TE-specific parameters 175 and the service mapping policy 182 as described in more detail below with reference to FIGS. 5-7 and as shown in the computer program listing at the end of this Detailed Description.

When NE 300 is the CNC 130, the Rx 320 receives VPN information that includes a VPN-specific SM 179 that includes attributes 173 for a VPN service. For example, the Rx 320 may receive a L1SM, L2SM, or L3SM that includes the one or more attributes 173. The Rx 320 may additionally receive a service mapping policy 182. The mapping module 355 is configured to generate the one or more TE-specific parameters 175 by invoking a TE service mapping model as described above with reference to FIG. 1. For example, the mapping module 355 may use the TE service mapping model to map the VPN-specific SM 179 to express the attributes 173 expressed in the VPN-specific SM 179 to a format of a different model 181 from which the MDSC controller 141 can generate a TE tunnel 163. For example, the mapping module 355 may be configured to map the VPN-specific SM 179 to an ACTN VN YANG model. Additionally or alternatively, the mapping module 355 may be configured to determine and/or store the service mapping policy 182 for the VPN service. The processor 305 generates a request 170 that includes the VPN-specific SM 179, the one or more TE-specific parameters 175, and the service mapping policy 182, and then the Tx 325 transmits the request 170 to the central controller 140. The Rx 320 receives a message from the central controller 140 indicating whether a TE tunnel 163 that satisfies the one or more TE-specific parameters 175 is established. The Rx 320 may receive the TE tunnel ID 190 from the central controller 140, or the processor 305 may generate the TE tunnel ID 190. The TE tunnel ID 190 may be stored in the TE tunnel mapping 365 of the memory 350.

When NE 300 is central controller 140, the Rx 320 receives the request 170 from the CNC 130. The request 170 includes the VPN-specific SM 179, the one or more TE-specific parameters 175, and the service mapping module 182. The mapping module 355 executed by the processor 305 is configured to determine the service mapping policy 182 for the VPN service from the service mapping policy 182 in the request 170.

When the service mapping policy 182 requires isolation, the mapping module 355 uses the VPN specific model 179 and the one or more TE-specific parameters 175 to determine a TE tunnel model that specifies the one or more attributes 173. In some examples, the mapping module 355 uses an intermediate model, such as the ACTN VN YANG model, to determine the TE tunnel model. In these examples, the mapping module 355 uses the VPN-specific SM 179 and the one or more TE-specific parameters 175 to determine an ACTN VN YANG model, and generates the TE tunnel model based on the ACTN VN YANG model. The NE 300 computes the TE tunnel 163, or interacts via the Tx 325 with PNCs to compute a TE tunnel 163, that satisfies the one or more TE-specific parameters 175 in the request 170. The Tx 325 transmits information regarding the computed TE tunnel 163 to an ingress PE node 104.

When the service mapping policy 182 in the request 170 indicates that sharing is allowed, the mapping module 355 determines whether an existing TE tunnel satisfies the one or more TE-specific parameters 175 and allows sharing, or interacts, via the Tx 325, with the PNCs (e.g., 131, 133, 135) to determine whether an existing TE tunnel satisfies the one or more TE-specific parameters 175 and allows sharing. When an existing TE tunnel satisfies the one or more TE-specific parameters 175 or allows sharing, the mapping module 355 assigns the existing tunnel to the VPN service. When no existing TE tunnel satisfies the one or more TE-specific parameters 175 and allows sharing, the mapping module 355 uses the VPN-specific SM 179 and the one or more TE-specific parameters 175 to determine a TE tunnel model that represents the one or more TE-specific parameters 175. The Tx 325 may also transmit a message indicating whether the TE tunnel 163 has been successfully established to the CNC 130. In some embodiments, the one or more TE-specific parameters 175 may be stored in the memory 350 of the central controller 140. The TE tunnel IDs 190 may also be stored in the TE tunnel mapping 365 of the memory 350 of the central controller 140.

It is understood that by programming and/or loading executable instructions onto the NE 300, at least one of the processor 305 and/or memory 350 are changed, transforming the NE 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC in a particular machine or apparatus, likewise a computer that has been programmed and/or loaded with executable instructions may be viewed as a particular machine or apparatus.

FIG. 4 is a table 400 illustrating examples of tunnel assignments. In an embodiment, table 400 stores tunnel information for network 100. In an embodiment, table 400 may be stored at the CNC 130 and/or the central controller 140. For example, the information in table 400 may be stored in a memory 350 of the CNC 130 and/or the central controller 140. Table 400 includes entries 450A-C corresponding to respective tunnels identified in a TE Tunnel ID column 402.

Table 400 includes a VPN ID column 401, a TE Tunnel ID column 402, a Parameter column 403, and a Service Mapping Policy column 404. The Parameter column 403 includes sub-columns 405 and 406 for various TE-specific parameters 175 that may be specified for a VPN service or TE tunnel. As shown in FIG. 4, table 400 includes two example TE-specific parameters 175 including latency level and a path protection level. Sub-column 405 defines the value for the latency level TE-specific parameter 175 and sub-column 406 defines the value for the path protection level TE-specific parameter 175. While only two example TE-specific parameters 175 are shown in FIG. 4, a VPN service may define any different type of attribute corresponding to a TE-specific parameter 175 associated with a network requirement for executing that VPN service or a TE tunnel. For example, the one or more TE-specific parameters 175 may include a bandwidth specification, which may define a value for a minimum bandwidth, maximum bandwidth, and/or permitted bandwidth range for a TE tunnel 163. The one or more TE-specific parameters 175 may include a throughput specification, which may define a value for a throughput in a TE tunnel 163 of network 100. Another of the one or more TE-specific parameters 175 may indicate how to re-route a TE tunnel 163 upon tunnel failure. For example, one of the one or more TE-specific parameters 175 may instruct to delegate re-routing of a TE tunnel 163 to the network without informing the CNC 130. The one or more TE-specific parameters 175 may also include a parameter that instructs to inform the CNC 130 of the tunnel failure so that the CNC 130 instantiates a new TE tunnel 163 after tunnel failure. The one or more TE-specific parameters 175 may also include values for other attributes, such as jitter, error rate, delay, bit rate, and/or other types of network performance requirement measurements as should be appreciated. The service mapping policy column 404 may indicate whether a TE tunnel 163 is physically isolated, or given a separate wavelength, or not.

As shown in FIG. 4, entries 450A-450C show examples of how TE tunnels 163 are assigned or created for VPN services. Entry 450A corresponds to a first VPN service having a VPN ID of "A". The one or more TE-specific parameters 175 for the first VPN service may specify that the latency level for the TE tunnel 163 created for the first VPN service may be less than 50 milliseconds (ms). The one or more TE-specific parameters 175 may specify that path protection should be enabled ("1+1") such that the TE tunnel 163 should be re-established upon failure. The service mapping policy 182 for the first VPN indicates that sharing of the TE tunnel is allowed. A TE tunnel 163 established for the first VPN service may be identified by a TE tunnel ID 190 of "D."

Entry 450B corresponds to a second VPN service having a VPN ID of "B". The one or more TE-specific parameters 175 for the second VPN service may specify that the latency level for the TE tunnel 163 created for the second VPN service may be less than 50 milliseconds (ms). The one or more TE-specific parameters 175 for the second VPN service may also specify that path protection may not be enabled (1:0) and that the TE tunnel 163 may be recovered when possible upon failure. The service mapping policy 182 for the second VPN indicates that sharing of the TE tunnel is allowed. A TE tunnel 163 established for the second VPN service may be identified by the TE tunnel ID 190 of "E."

Entry 450C corresponds to a third VPN service having a VPN ID of "C". The one or more TE-specific parameters 175 for the third VPN service may specify that the latency level for the TE tunnel 163 created for third VPN service should not be considered when determining a tunnel for the third VPN service. The one or more TE-specific parameters 175 for the third VPN service may specify that path protection may be enabled. The service mapping policy 182 for the third VPN service indicates that sharing of the TE tunnel is not allowed. A TE tunnel 163 established for the third VPN service may be identified by the TE tunnel ID 190 of "F."

In this example, when the CNC 130 receives an L3SM request for a fourth VPN service that specifies a latency level of <50 ms, and a path protection 1+1, and when the service mapping policy 182 mapped to the fourth VPN service indicates that tunnel sharing is allowed, the MDSC may search the tunnel assignments for an existing TE tunnel that satisfies the latency level and the path protection. The MDSC may determine that the TE tunnel for the first VPN service satisfies the latency level and the path protection and allows sharing. In response to determining that the TE tunnel for the first VPN service satisfies the latency level and the path protection requirements of the fourth VPN service, and that the service mapping policy 182 for the first VPN service allows sharing, the MDSC may assign the fourth VPN service to the TE tunnel having TE tunnel ID 190 "D".

While only three entries 450A-C are shown, it should be appreciated that any number of entries may be included in table 400 corresponding to different VPN services in network 100. While each entry 450A-C only shows two TE-specific parameters 175 associated with a VPN service, it should be appreciated that any number of TE-specific parameters 175 may be associated with a VPN service. While the mappings of VPN IDs 171, TE tunnel IDs 190, TE-specific parameters 175, and service mapping policies 182 are shown in FIG. 4 in the form of a table, it should be appreciated that table 400 is an abstraction of the information that is stored at either the CNC 130 and/or the central controller 140. In this way, the mappings of VPN IDs 172, TE tunnel IDs 190, TE-specific parameters 175, and service mapping policies 182 may be otherwise stored in any other data structure or in a distributed manner.

Figure 5:
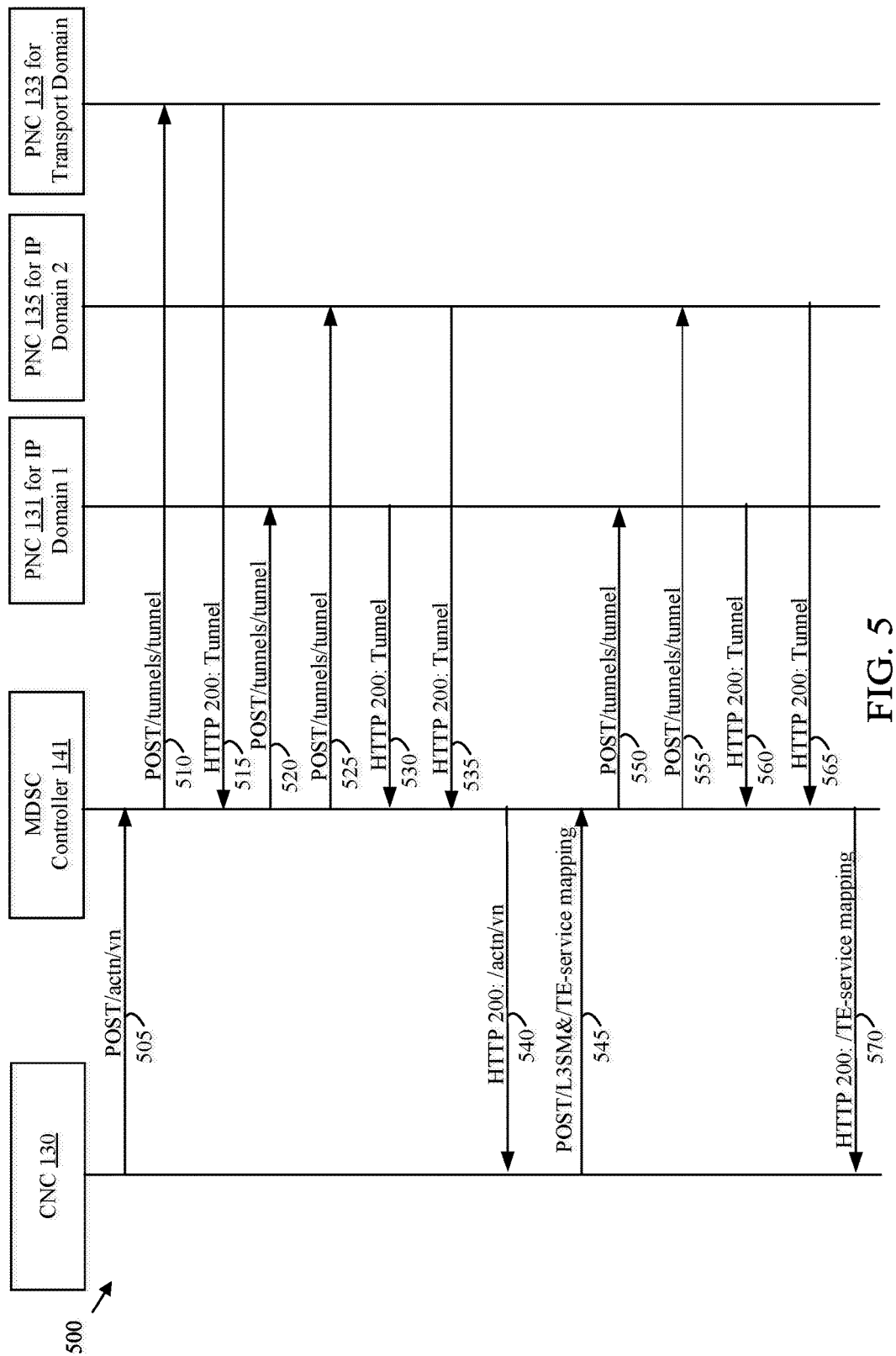
FIG. 5 is a protocol diagram illustrating an embodiment of a method for creating TE tunnels in the network.

FIG. 5 is a diagram of a workflow 500 for L3VPN/VN/tunnel provisioning according to an embodiment of the disclosure. At step 505, the CNC 130 sends the MDSC controller 141 a message that carries an ACTN VN YANG model. At step 510, the MDSC controller 141 sends the PNC 133 a message to create a tunnel using a tunnel model (e.g., a TE tunnel model). At step 515, the PNC 133 sends the MDSC controller 141 a message including configured information (e.g., such as tunnel ID), and the MDSC controller 141 updates the TE tunnel model. At step 520, the MDSC controller 141 sends the PNC 131 a message to create a TE tunnel using a tunnel model (e.g., a TE tunnel model). At step 525, the MDSC controller 141 sends the PNC 135 a message to create a TE tunnel using a tunnel model (e.g., a TE tunnel model). At step 530, the PNC 131 sends the MDSC controller 141 a message including configuration information (e.g., such as tunnel ID), and the MDSC 141 updates the TE tunnel model. At step 535, the PNC 135 sends the MDSC controller 141 a message including configuration information (e.g., such as tunnel ID), and the MDSC 141 updates the TE tunnel model. At step 540, the MDSC controller 141 sends the CNC 130 a message including configuration information, and the CNC 130 updates the ACTN VN YANG model. At step 545, the CNC 130 sends the MDSC controller 141 a message including an L3SM for a VPN service and a TE Service Mapping Model (such as the TE Service Mapping Model 202 of FIG. 2). At step 550, the MDSC controller 141 sends the PNC 131 a message to create a TE tunnel using a tunnel model (e.g., a TE tunnel model). At step 555, the MDSC controller 141 sends the PNC 135 a message to create a TE tunnel using a tunnel model (e.g., a TE tunnel model). At step 560, the PNC 131 sends the MDSC controller 141 a message including configuration information (e.g., such as the TE tunnel ID 190), and the MDSC controller 141 updates the TE Service Mapping model with the configuration information. At step 565, the PNC 135 sends the MDSC controller 141 a message including configuration information (e.g., such as the TE tunnel ID 190), and the MDSC controller 141 updates the TE Service Mapping model with the configuration information. At step 570, the MDSC controller 141 sends the CNC 130 a message including configuration information (e.g., such as the TE tunnel ID 190), and the MDSC controller 141 updates the TE Service Mapping model with the configuration information.

Figure 6:
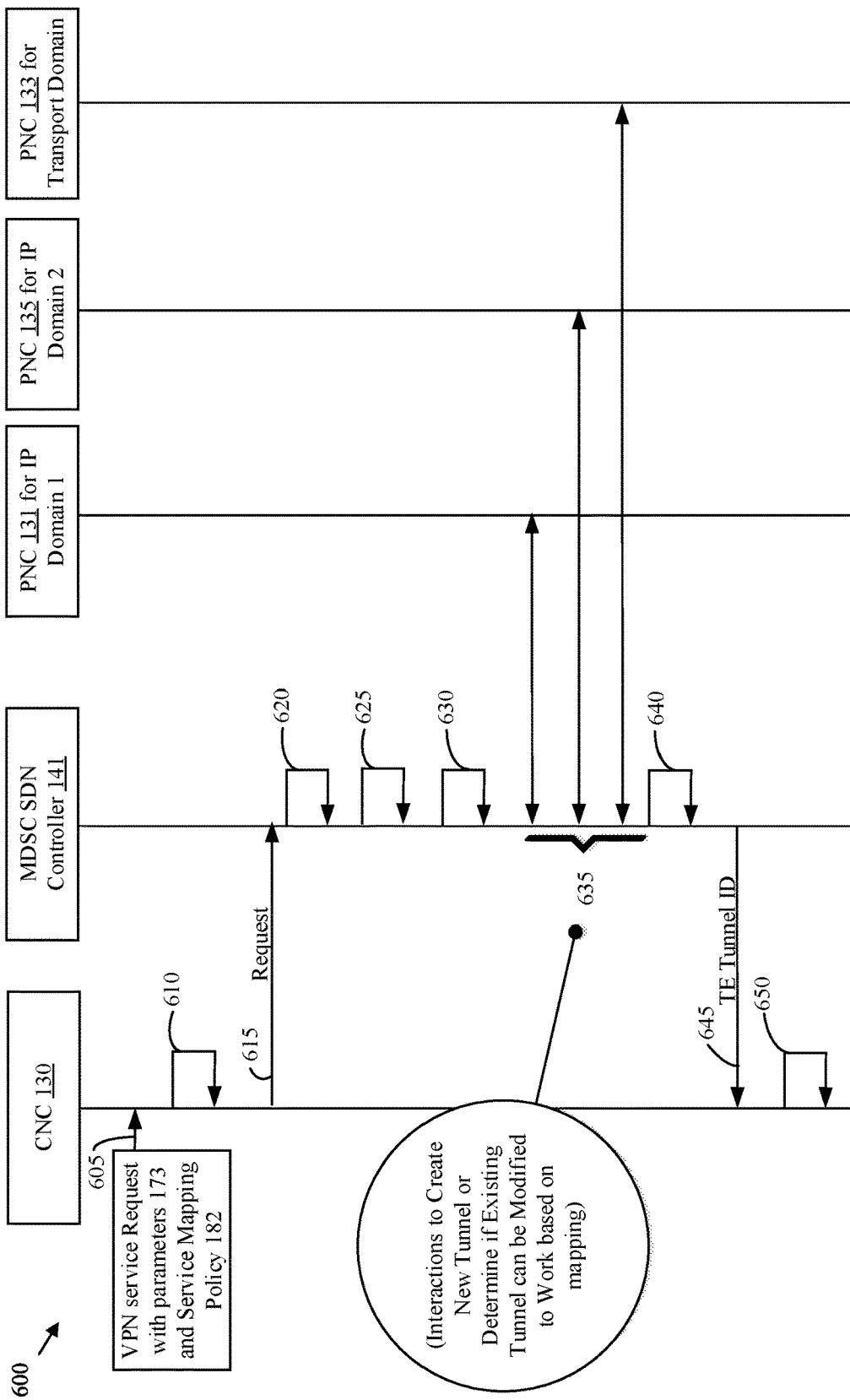
FIG. 6 is a protocol diagram illustrating an embodiment of a method for creating tunnels in the network.

FIG. 6 is a protocol diagram illustrating an embodiment of a method 600 for setting up a TE tunnel in a network 100 according to one or more attributes 173 expressed using a VPN-specific SM 179 and according to a service mapping policy 182. The method 600 is implemented by a CNC 130, a central controller 140, PNCs 131, 135 for different IP domains 1, 2, and a PNC 133 for a transport domain 3. At step 605, the CNC 130 receives a VPN service request with attributes 173 expressed using a VPN-specific SM 179, and receives a service mapping policy 182. At step 610, the CNC 130 determines the one or more TE-specific parameters 175 as described above with reference to FIGS. 1 and 2. For example, the VPN-specific SM 179 may correspond to an L3SM and may indicate attributes 173 for the VPN service. At step 610, the CNC 130 uses the TE service mapping model 202 to determine one or more TE-specific parameters 175 (e.g., of a different model 181) that correspond to the attributes 173 expressed using the L3SM. For example, the different model 181 may be the ACTN VN YANG model. The CNC 130 also uses the TE service mapping model to determine the service mapping policy 182.

At step 615, a request 170 may be transmitted to the central controller 140. For example, Tx 225 of CNC 130 transmits the request 170 to the central controller 140. The request 170 may be generated at various times as specified by a customer or an operator of network 100. For example, the request 170 may be generated upon initiation of a VPN service or at certain predefined times as specified by a tunnel management schedule. The request 170 includes the VPN-specific SM 179, the one or more TE-specific parameters 175, and the service mapping policy 182. The request 170 may be a request for the central controller 140 to setup, according to the service mapping policy 182, a TE tunnel 163 that satisfies the attributes 173 specified using the VPN-specific SM 179.

At step 620, the central controller 140 determines whether the service mapping policy 182 allows sharing. When the service mapping policy 182 allows sharing, the flow proceeds from step 620 to step 625. At step 625, the MDSC controller 141 searches a tunnel assignment to determine whether an existing TE tunnel satisfies the attributes 173 and allows sharing. For example, the MDSC controller 141 may search the tunnel assignments in table 400 of FIG. 4. When an existing TE tunnel satisfies the attributes 173 and allows sharing, the flow proceeds from step 625 to step 640, where the MDSC controller 141 updates the tunnel assignments to reflect that VPN service is assigned to the TE tunnel that satisfies the attributes 173 and that allows sharing.

When the service mapping policy 182 does not allow sharing or when step 625 does not determine an existing TE tunnel that can be used, the flow proceeds from step 620 or step 625 to step 630, where the MDSC controller 141 uses the TE service mapping model 202 to determine a TE tunnel model based on the VPN-specific SM 179 and the one or more TE-specific parameters 175. In some examples, the MDSC controller 141 uses the TE service mapping model 202 to translate or map the VPN-specific SM 179 to an ACTN VN YANG model such that the ACTN VN YANG model expresses the one or more attributes 173 (that are expressed in the VPN-specific SM 179) in a format (e.g., via one or more TE-specific parameters 175) that enables the MDSC controller 141 to generate a TE tunnel request 192 using the TE tunnel model. In these examples, the TE service mapping model 202 employs an intermediate service model between the VPN-specific SM 179 and the TE tunnel model. In other examples, an intermediate service model is not used. In these examples, the MDSC controller 141 is configured to translate or map directly between the VPN-specific SM 179 and the TE tunnel model. The flow then proceeds to step 635, where the MDSC controller 141 interacts with the PNCs 131, 133, 135 using the TE tunnel model and according to the service mapping policy 182. For example, when the service mapping policy 182 does not allow sharing, the MDSC controller 141 interacts with the PNCs 131, 133, 135 using the TE tunnel model to create a new TE tunnel 163 that satisfies the one or more TE-specific parameters 175. When the service mapping policy 182 allows modification, the MDSC controller 141 interacts with the PNCs 131, 133, 135 to determine whether an existing tunnel can be modified to satisfy the one or more TE-specific parameters 175. When an existing tunnel can be modified, then MDSC controller 141 modifies and selects that TE tunnel. Otherwise, the MDSC controller 141 interacts with PNCs 131, 133, 135 using TE tunnel model to create new tunnel that satisfies the one or more TE-specific parameters 175. Once a new TE tunnel 163 is created or an existing tunnel is modified, the flow proceeds from step 635 to step 640, where the MDSC controller 141 updates the tunnel assignments to reflect that VPN service is assigned to the newly created or modified TE tunnel.

At step 645, the central controller 140 sends a message back to the CNC 130 indicating whether the TE tunnel 163 that satisfies the TE constraints for the VPN service specified by the VPN ID 171 has been successfully established. For example, the Tx 325 of the MDSC controller 141 transmits the message back to the CNC 130. For example, the message sent back to the CNC 130 may be an acknowledge (ACK) or a negative ACK (NACK) message. In an embodiment, the central controller 140 generates the TE tunnel ID 190 corresponding to a newly created TE tunnel 163 and sends the TE tunnel ID 190 back to the CNC 130 in the message. In an embodiment, at step 650, the central controller 140 stores VPN information for the VPN service in a manner similar to how the CNC 130 stores VPN information for the VPN service. In an embodiment, the central controller 140 may update the stored VPN information for the VPN service to include the TE tunnel ID 190 of the newly created TE tunnel 163.

Figure 7:
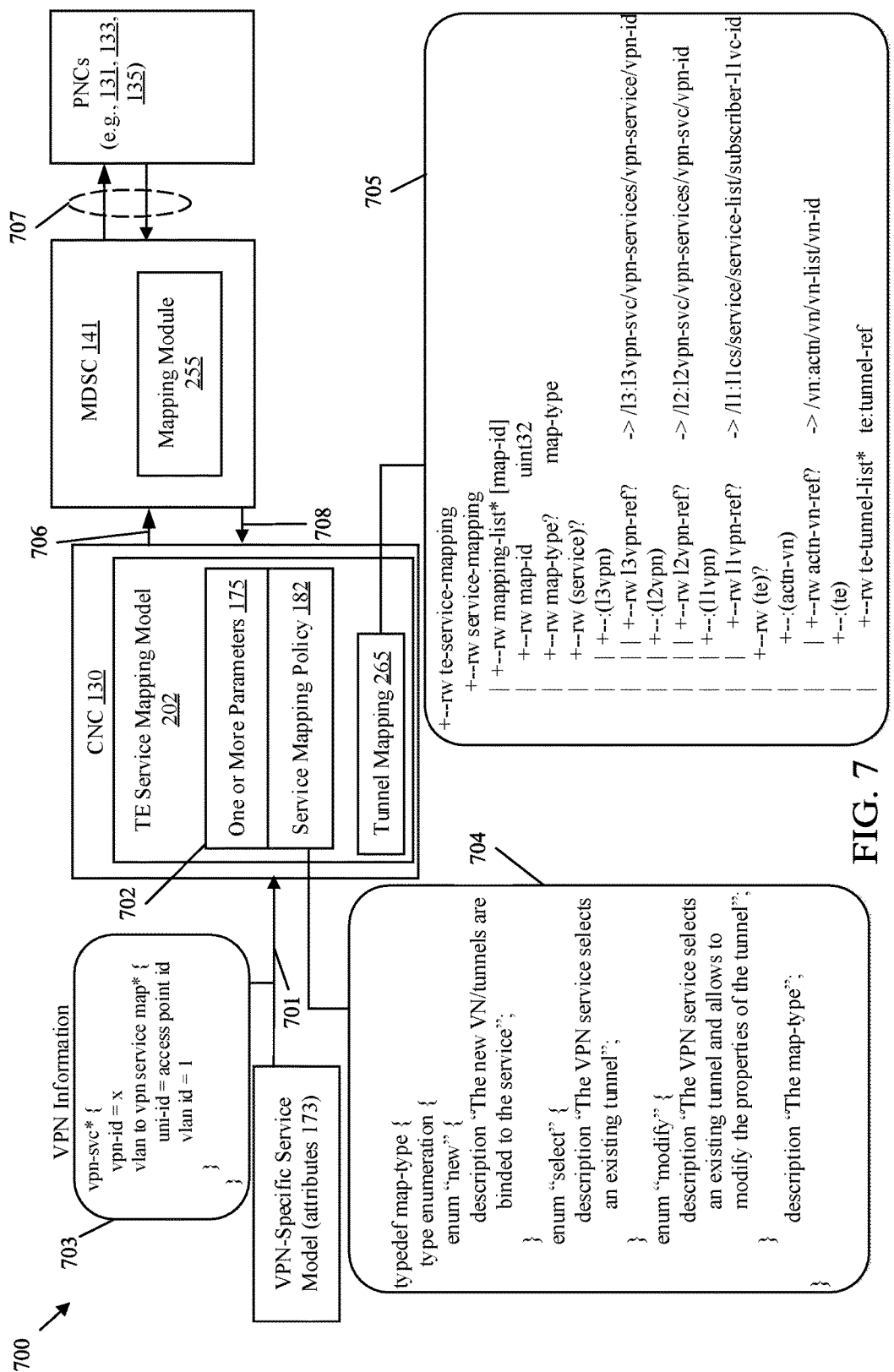
FIG. 7 is a diagram illustrating an embodiment of a method for creating TE tunnels in the network according to a service mapping policy including data models representing information that is received by and stored at the CNC.

FIG. 7 is a diagram illustrating an embodiment of a method 700 for creating TE tunnels 163 in a network 100 using a TE service mapping model (e.g., the TE service mapping model 202 of FIG. 2). Method 700 includes data models 703-705 representing information that is received by and stored at the CNC 130.

At step 701, the CNC 130 runs the TE service mapping model 202 and imports the VPN information in the form of the data model 703 for carrying the VPN information. The data model 703 is a data model consistent with the data modeling language proposed in L3SM, as described in the L3SM document. In an embodiment, the data model 703 for carrying the VPN information defines VPN IDs 171 and one or more attributes 173 associated with the VPN. The data model 703 for carrying the VPN information may further include VPN IDs 171 for the VPNs associated with a customer, access point IDs, and/or other information that may be sent by CEs 103 and 108.

In an embodiment, the VPN information described in step 701 is stored in the memory 350 of FIG. 3. In some embodiments, the CNC 130 stores the service mapping policy 182 in the form of the data model 704. The data model 704 for storing the service mapping policy 182 may include mapping IDs, reference numbers for VPNs, and/or other information that identifies and describes the VPN service and the service mapping policy 182.

At step 702, the CNC 130 uses the TE service mapping model 202 to determine the one or more TE-specific parameters 175. For example, the CNC 130 uses the TE service mapping model 202 to determine one or more TE-specific parameters 175 that correspond to the attributes 173 expressed using the VPN specific SM 179. The CNC 130 may store the one or more TE-specific parameters 175 according to the ACTN VN YANG model. The CNC 130 may store the one or more TE-specific parameters 175 such that the one or more TE-specific parameters 175 are mapped to the VPN-specific SM 179, e.g., by relating the one or more TE-specific parameters 175 to the VPN ID 171 of the VPN service.

At step 706, the CNC 130 sends the request 170 to the MDSC controller 141. The request 170 includes the VPN-specific SM 179 (e.g., the L3SM), the one or more TE-specific parameters 175, and the service mapping policy 182. The MDSC controller 141 determines the service mapping policy 182 for the VPN service according to the service mapping policy 182 in the request 170.

When the service mapping policy 182 indicates that tunnel sharing is allowed, the MDSC controller 141 determines whether an existing TE tunnel satisfies the one or more TE-specific parameters 175 in the ACTN VN YANG model. For example, the MDSC controller 141 may access TE tunnel assignments to determine whether existing TE tunnels satisfy the one or more TE-specific parameters 175 and allow sharing as described above with reference to FIGS. 1-6. When the MDSC controller 141 determines that an existing TE tunnel satisfies the one or more TE-specific parameters 175 and allows sharing, the MDSC controller 141 determines to use the existing TE tunnel for the VPN service. The MDSC controller 141 communicates with the PNCs 131, 133, 135 at step 707 to associate the VPN ID 171 of the VPN service with the TE tunnel 163 (e.g., via the TE tunnel ID 190) and updates the state.

When TE tunnel sharing is not allowed, or when the MDSC controller 141 determines that no existing TE tunnel both satisfies the one or more TE-specific parameters 175 and allows sharing and the service mapping policy 182 does not allow modification, the MDSC controller 141 translates and maps the one or more TE-specific parameters 175 expressed using the ACTN VN YANG model into a network centric model (e.g., TE tunnel model). The MDSC controller 141 then interacts, at step 707, with the PNCs 131, 133, 135 to create a TE tunnel 163 that satisfies the one or more TE-specific parameters 175 (and thus the attributes 173).

When the MDSC controller 141 determines that no existing TE tunnel satisfies the one or more TE-specific parameters 175 but that at least one existing tunnel allows sharing and the service mapping policy 182 allows modification, the MDSC controller 141 translates and maps the one or more TE-specific parameters 175 expressed using the ACTN VN YANG model into a network centric model (e.g., TE tunnel model). The MDSC controller 141 then interacts, at step 707, with the PNCs 131, 133, 135 to determine if an existing TE tunnel can be modified to satisfy the one or more TE-specific parameters 175. If no existing TE tunnel can be modified to satisfy the one or more TE-specific parameters 175, the MDSC controller 141 interacts with the PNCs 131, 133, 135 to create a TE tunnel 163 that satisfies the one or more TE-specific parameters 175 (and thus the attributes 173).

At step 708, after establishing the TE tunnel 163 (e.g., assigning an unmodified existing TE tunnel, assigning a modified existing TE tunnel, or creating a new TE tunnel) in response to the request 170, the MDSC controller 141 transmits a message to the CNC 130 indicating whether the TE tunnel 163 has been successfully established. The message may be similar to the message described in step 645 of FIG. 6. In an embodiment, the central controller 140 transmits a TE tunnel ID 190 uniquely identifying the TE tunnel 163 established for the request 170 in the message. In an embodiment, the CNC 130 determines a TE tunnel ID 190 after receiving the message. The CNC 130 stores the TE tunnel ID 190 in relation to the VPN ID 171 for the VPN service, the one or more TE-specific parameters 175, and the service mapping policy 182 in the tunnel mapping 365. In some embodiments, the CNC 130 stores the TE tunnel ID 190 in the form of the data model 705. The data model 705 for storing the TE tunnel IDs 190 may include the TE tunnel IDs 190, service mapping types that identify the service mapping policy 182, reference numbers for VPNs, and/or other information that identifies and relates TE tunnels 163 with and to a VPN service.

FIG. 8 is a read-write YANG data tree 800 defining how VPN-specific SMs 179 are mapped to ACTN VN or TE tunnel models at the CNC 130 or the central controller 140. The read-write YANG data tree 800 is consistent with the data modeling language proposed in the YANG DATA MODEL DOC. In an embodiment, the one or more TE-specific parameters 175, the service mapping policy 182, and/or the TE tunnel mapping 365 may be stored using the read-write YANG data tree 800. In such an embodiment, each VPN service that requires a TE underlay tunnel is mapped to the corresponding TE tunnel 163 with a service mapping policy 182 indicated by "map-type" as shown using the data model 704 in FIG. 7. The "service-mapping" maps, for each VPN, the map-type policy, which VPN-specific SM 179 is described, and what TE-tunnel ID or VN ID is mapped to the VPN. The "te" refers to the TE tunnel YANG model that provides the TE tunnel ID 190 once the TE tunnel 163 is instantiated. Additionally or alternatively, each site for the VPN service is mapped to the corresponding TE tunnel (e.g., as indicated by the "site-mapping"). Users are given the ability to configure/program the mapping type (e.g., the service mapping policy).

FIG. 9 is a read-only YANG data tree 900 defining how ACTN VN or TE tunnels are mapped to L1SM, L2SM, or L3SM service models at the CNC 130 or the central controller 140. The read-only YANG data tree 900 is consistent with the data modeling language proposed in the YANG DATA MODEL DOC. In an embodiment, the one or more TE-specific parameters 175, the service mapping policy 182, and/or the TE tunnel mapping 365 may be stored using the read-only YANG data tree 900. In such an embodiment, the users can access the operational state (read-only) of YANG Data model described in the read-write YANG data tree 800.

Figure 10:
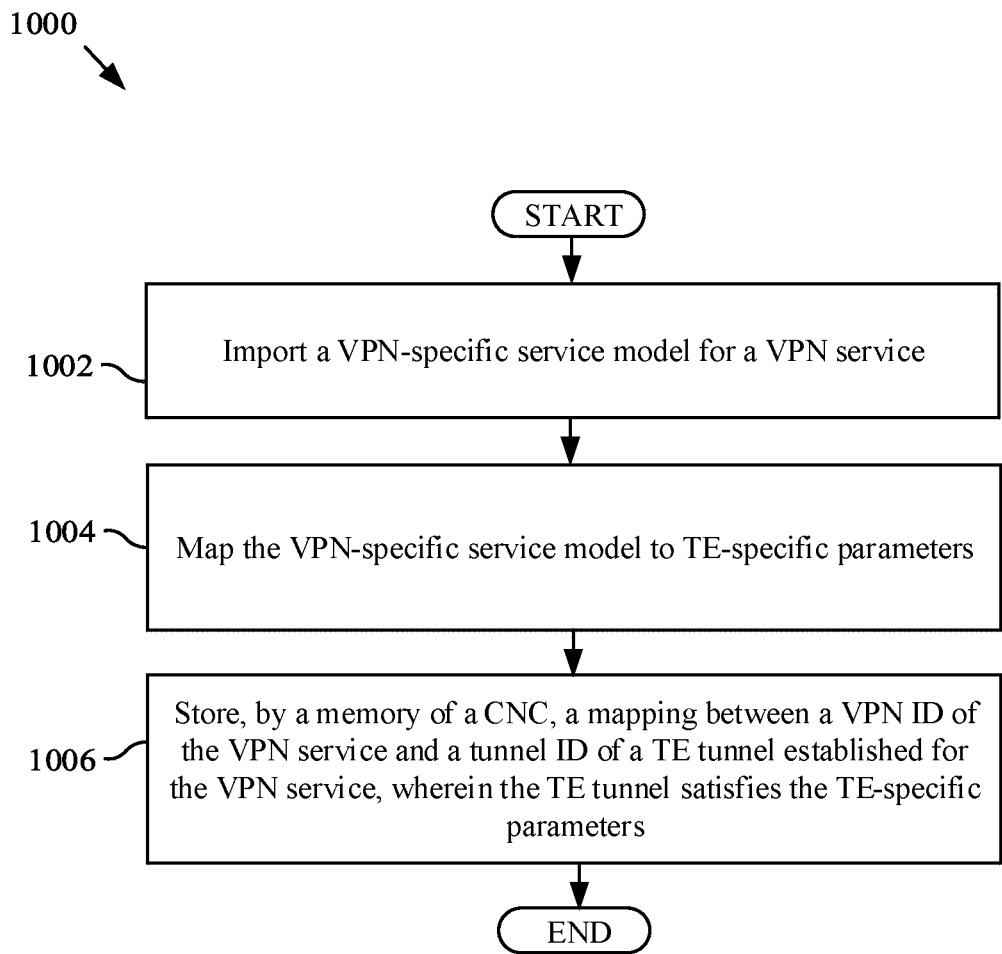
FIG. 10 is a method of initiating the establishment of a TE tunnel for a VPN service requested using a VPN-specific service model.

FIG. 10 is a method 1000 of initiating the establishment of a TE tunnel 163 for a VPN service requested using a VPN-specific service model. The method 1000 may be performed when the CNC 130 receives VPN information from CEs 103 and/or 108. In an embodiment, the method 1000 may be performed by the CNC 130. The method 1000 includes importing, at step 1002, a VPN-specific SM. For example, the VPN-specific service model may correspond to the VPN-specific SM 179 described above with reference to FIG. 1. To illustrate, the VPN-specific SM may correspond to an L1SM, an L2SM, or an L3SM. The VPN-specific SM may be imported using a TE service mapping model 202 as described with reference to step 701 of FIG. 7.

The method 1000 includes mapping, at step 1004, the VPN-specific SM 179 to one or more TE-specific parameters. For example, the VPN-specific SM 179 may define one or more attributes (e.g., such as the attributes 173) for the VPN service using language, names, parameters, ranges, or a combination thereof, of the VPN-specific SM 179. The CNC 130 may use the TE service mapping model 202 to translate and/or map the attributes 173 expressed using the VPN-specific SM 179 to TE-specific parameters (e.g., the one or more TE-specific parameters 175 described above with reference to FIGS. 1-9). The one or more TE-specific parameters 175 are parameters used by a different model 181 than the VPN-specific SM 179. For example, the one or more TE-specific parameters 175 may correspond to parameters that the ACTN VN YANG model uses to define the one or more attributes 173. Alternatively or additionally, the one or more TE-specific parameters 175 may correspond to parameters that a TE tunnel model uses to define the one or more attributes 173. The CNC 130 may map the VPN-specific SM 179 to the one or more TE-specific parameters 175 by relating the one or more TE-specific parameters 175 to the VPN service (e.g., via a VPN service ID) in a data structure. Thus, in this manner, the method 1000 maps the VPN-specific service model to a TE-oriented model (e.g., to TE-specific parameters).

The method 1000 includes storing, at step 1006 by a memory of the CNC 130, a mapping between a VPN ID 171 of the VPN service and a TE tunnel ID 190 of a TE tunnel 163 established for the VPN service. The TE tunnel 163 satisfies the one or more TE-specific parameters 175. In an embodiment, the VPN ID 171 for the VPN service and the TE tunnel ID 190 may be stored in the form of data model 705 of FIG. 7.

In some examples, the method 1000 further includes sending the VPN-specific SM 179 to an MDSC controller 141, sending the one or more TE-specific parameters 175 to the MDSC controller 141, and receiving the TE tunnel ID 190 from the MDSC controller 141. For example, the Tx 325 of FIG. 3 may send the VPN-specific SM 179 and the one or more TE-specific parameters 175 to the MDSC controller 141, and the Rx 320 of FIG. 3 may receive the TE tunnel ID 190 from the MDSC controller 141.

In some examples, the method 1000 further includes mapping the VPN service to a service mapping policy 182 that indicates whether TE tunnel sharing is allowed for the VPN service. In some examples, the mapping module 355 of FIG. 3 uses the TE service mapping model 202 to map the service mapping policy 182 to the VPN service as indicated in FIGS. 8 and 9, and the computer program listing at the end of this Detailed Description. In some examples, the method 1000 additionally includes transmitting the service mapping policy 182 to an MDSC controller 141. For example, the Tx 325 of FIG. 3 transmits the service mapping policy 182 to the MDSC controller 141.

Figure 11:
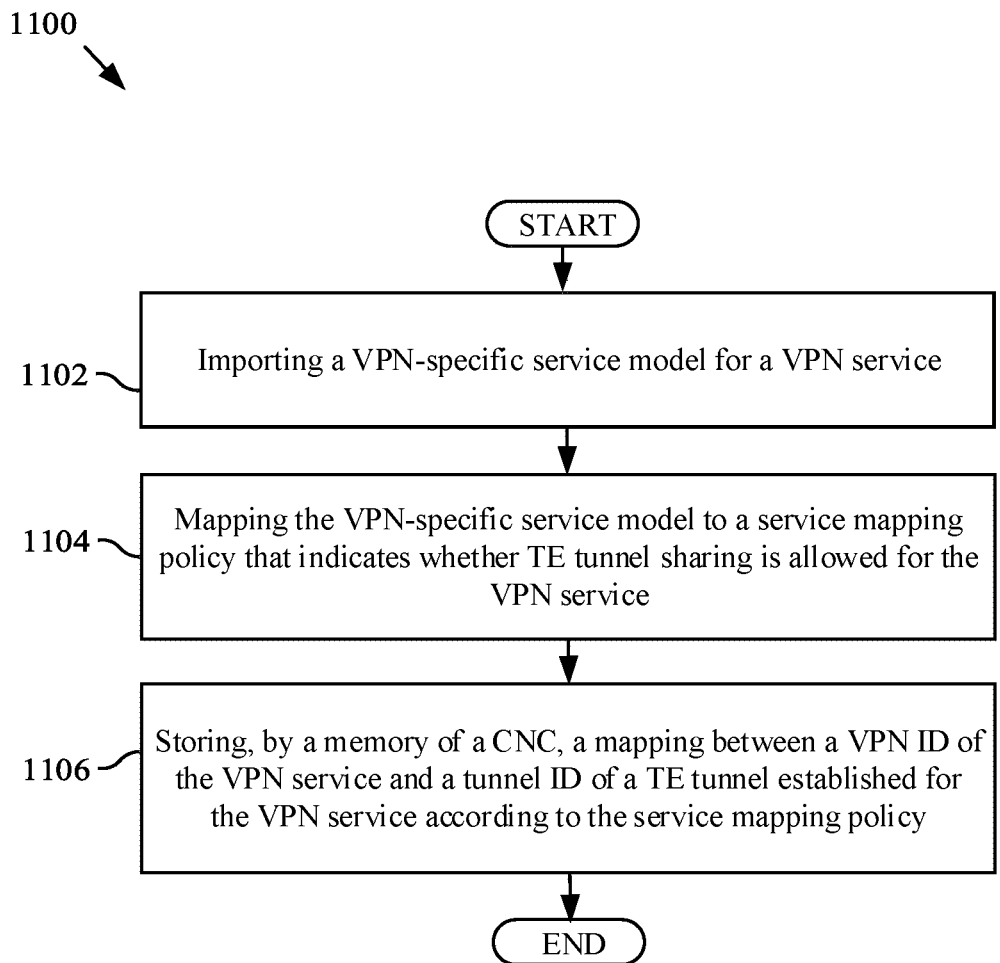
FIG. 11 is a method of initiating the establishment of a TE tunnel according to a service mapping policy.

FIG. 11 is a method 1100 of initiating the establishment of a TE tunnel according to a service mapping policy 182. The method 1100 may be performed by the CNC 130 of FIG. 1 or the NE 200 of FIG. 2. The method 1100 includes importing, at step 1102, a VPN-specific SM 179 for a VPN service. The VPN-specific SM 179 may correspond to an L1SM, an L2SM, or an L3SM. The VPN-specific SM 179 may be imported using a TE service mapping model 202 as described with reference to step 701 of FIG. 7.

The method 1100 includes mapping, at step 1104, the VPN-specific SM 179 to a service mapping policy 182 that indicates whether TE tunnel sharing is allowed for the VPN service. For example, the service mapping policy 182 may indicate different modes described above with reference to FIG. 1. To illustrate, the service mapping policy 182 may be selected from a plurality of modes including a first mode that requires a new TE tunnel that is not shared with any existing VPN services, a second mode that allows use of an existing TE tunnel that is shared with an existing VPN service and that does not allow for modification of the existing TE tunnel, and a third mode that allows for use of an existing tunnel that is shared with an existing VPN service and that allows for modification of the existing TE tunnel. The CNC 130 may use the TE service mapping model 202 to map the service mapping policy 182 to the VPN service. To illustrate, the TE service mapping model 202 may use the data model 704 of FIG. 7 to determine the service mapping policy 182 for the VPN service, and may use the data tree 800 of FIG. 8 to map the VPN service to the service mapping policy 182.

The method 1100 includes storing, at step 1106 by a memory of the CNC 130, a mapping between a VPN ID 171 of the VPN service and a TE tunnel ID 190 of a TE tunnel 163 established for the VPN service according to the service mapping policy 182. In an embodiment, the VPN ID 171 for the VPN service and the TE tunnel ID 190 may be stored in the form of data model 705 of FIG. 7.

In some examples, the method 1100 further includes sending the service mapping policy 182 to an MDSC controller 141, and receiving the TE tunnel ID 190 from the MDSC controller 141. For example, the Tx 325 of FIG. 3 may send the service mapping policy 182 to the MDSC controller 141, and the Rx 320 of FIG. 3 may receive the TE tunnel ID 190 from the MDSC controller 141.

Figure 12:
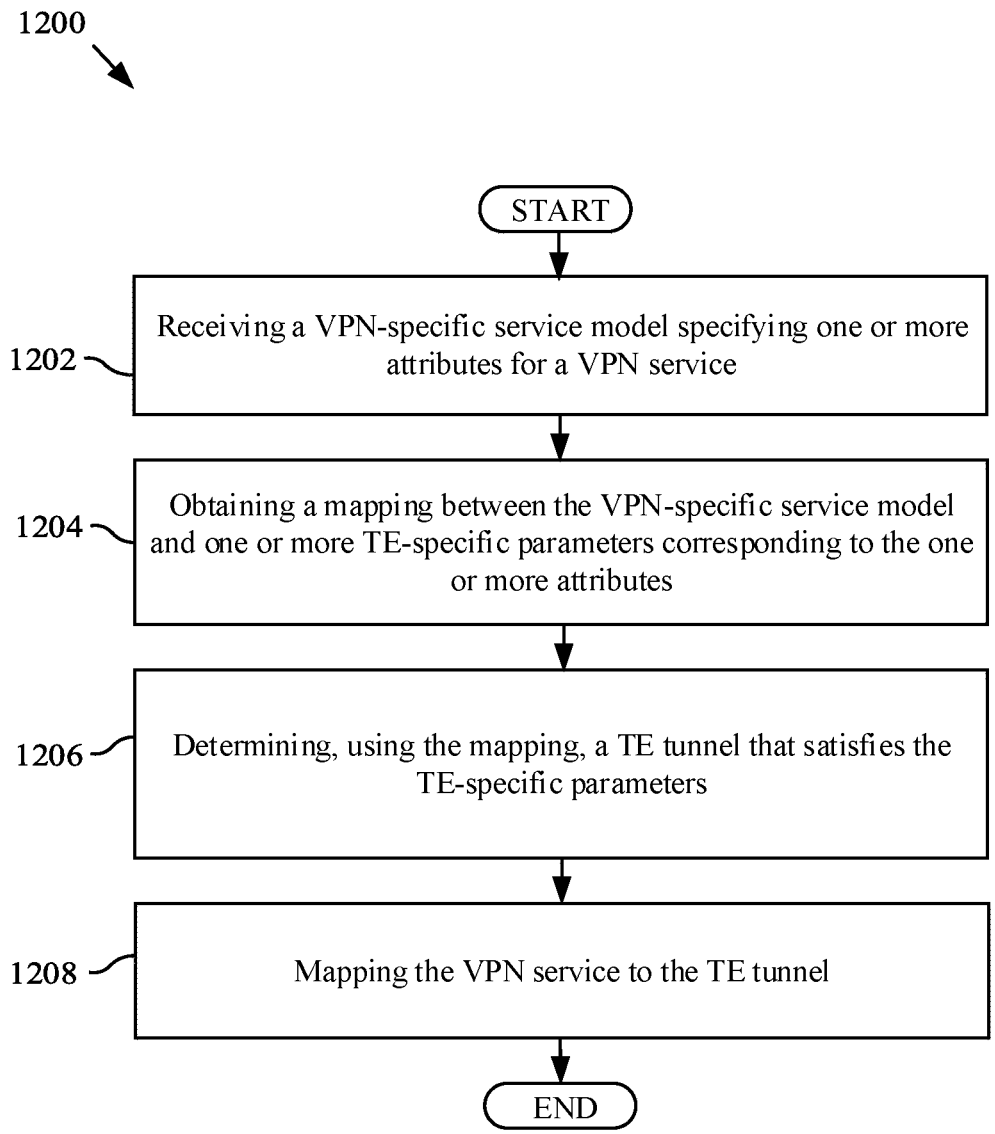
FIG. 12 is a method of establishing a TE tunnel for a VPN service requested using a VPN-specific service model.

FIG. 12 is a method 1200 of establishing a TE tunnel 163 for a VPN service requested using a VPN-specific SM 179. The method 1200 may be performed when the central controller 140 receives a VPN request, a VN creation request, or some other communication, from a CNC 130. In an embodiment, the method 1200 may be performed by the central controller 140. For example, the method 1200 may be performed by an MDSC controller 141, a super controller, a PNC, and/or a domain controller. The method 1200 includes receiving, at step 1202, a VPN-specific SM 179 specifying one or more attributes 173 for a VPN service. For example, the VPN-specific SM 179 may correspond to an L1SM, an L2SM, or an L3SM. For example, Rx 320 of FIG. 3 may receive the VPN-specific SM 179 from CNC 130.

The method 1200 further includes obtaining, at step 1204, a mapping between the VPN-specific SM 179 and one or more TE-specific parameters 175 corresponding to the one or more attributes 173. The TE-specific parameters 175 are parameters used by a different model 181 than the VPN-specific SM 179. For example, the TE-specific parameters 175 may correspond to parameters that the ACTN VN YANG model uses to define the one or more attributes 173. Alternatively or additionally, the TE-specific parameters 175 may correspond to parameters that a TE tunnel model uses to define the one or more attributes 173. In some example, the MDSC controller 141 obtains the mapping from the CNC 130. In other examples, the MDSC controller 141 obtains the mapping by determining the mapping using the TE service mapping model 202. The mapping maps the VPN-specific SM 179 to the one or more TE-specific parameters 175 by relating the one or more TE-specific parameters 175 to the VPN service (e.g., via a VPN ID 171) in a data structure. Thus, in this manner, the MDSC controller 141 obtains a mapping between the VPN-specific SM 179 and a TE-oriented model (e.g., one or more TE-specific parameters 175).

The method 1200 further includes determining, at step 1206, using the mapping, a TE tunnel that satisfies the one or more TE-specific parameters 175. This step may include searching tunnel assignments, determining a TE tunnel model based on the TE-specific parameters 175 (e.g., determining a TE tunnel model from an ACTN VN YANG model that includes the TE-specific parameters 175), interacting with PNCs (e.g., using the TE tunnel model), or a combination thereof, as described above with reference to FIGS. 1-9.

The method 1200 further includes mapping, at step 1208, the VPN service to the TE tunnel 163. For example, the MDSC controller 141 may store a mapping between a TE tunnel ID 190 of the TE tunnel 163 and a VPN ID 171 of the VPN service. For example, the mapping between the TE tunnel ID 190 of the TE tunnel 163 and the VPN ID 171 of the VPN service may be stored in the TE tunnel mapping 365 of FIG. 3.

Figure 13:
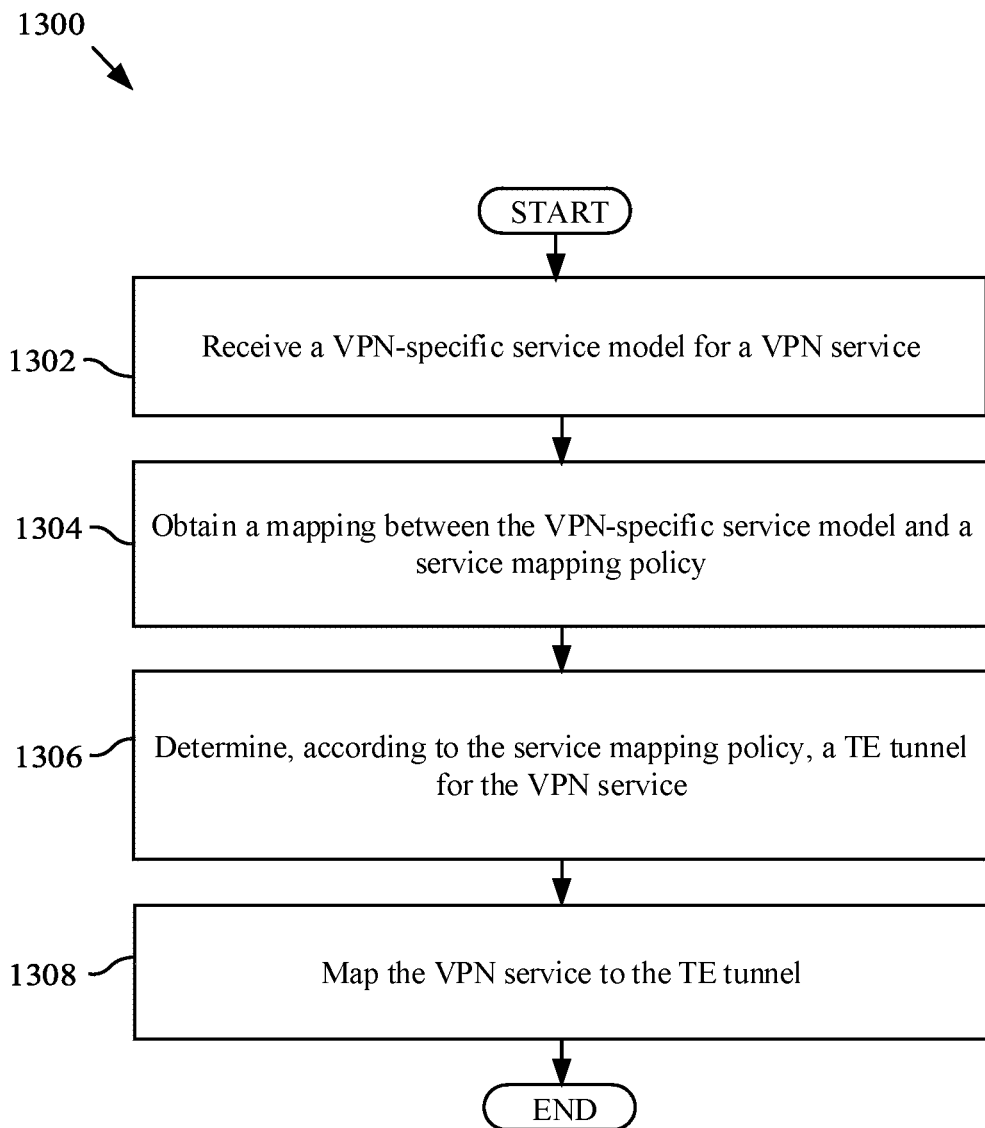
FIG. 13 is a method of establishing a TE tunnel for a VPN service requested using a VPN-specific service model.

FIG. 13 is a method 1300 of establishing a TE tunnel 163 for a VPN service requested using a VPN-specific SM 179. The method 1300 may be performed when the central controller 140 receives a VPN request, a VN creation request, or some other communication, from a CNC 130. In an embodiment, the method 1300 may be performed by the central controller 140. For example, the method 1300 may be performed by an MDSC controller 141, a super controller, a PNC, and/or a domain controller. The method 1300 includes receiving, at step 1302, a VPN-specific SM 179 specifying one or more attributes 173 for a VPN service. For example, the VPN-specific SM 179 may correspond to an L1SM, an L2SM, or an L3SM. For example, Rx 320 receives the VPN-specific SM 179 from CNC 130.

The method 1300 further includes obtaining, at step 1304, a mapping between the VPN-specific SM 179 and a service mapping policy 182. The service mapping policy 182 may correspond to the service mapping policy 182 described above with reference to FIGS. 1-9. The mapping maps the VPN-specific SM 179 to the service mapping policy 182 by relating the service mapping policy 182 to the VPN service (e.g., via a VPN service ID) in a data structure. As an example, the CNC 130 or the MDSC controller 141 may map the VPN-specific SM 179 to the service mapping policy 182 using the data model 704 of FIG. 7. Thus, in this manner, the MDSC controller 141 obtains a mapping between the VPN-specific SM 179 and the service mapping policy 182.

The method 1300 further includes determining, at step 1306, according to the service mapping policy 182, a TE tunnel 163 for the VPN service. This step may include searching tunnel assignments, determining a TE tunnel model based on the one or more TE-specific parameters 175 (e.g., determining a TE tunnel model from an ACTN VN YANG model that includes the TE-specific parameters 175), interacting with PNCs (e.g., using the TE tunnel model), or a combination thereof, as described above with reference to FIGS. 1-9.

The method 1300 further includes mapping, at step 1308, the VPN service to the TE tunnel 163. For example, the MDSC controller 141 may store a mapping between a TE tunnel ID 190 of the TE tunnel 163 and a VPN ID 171 of the VPN service. For example, the mapping between the TE tunnel ID 190 of the TE tunnel 163 and the VPN ID 171 of the VPN service may be stored in the TE tunnel mapping 365 of FIG. 3.

A CNC apparatus includes means for processing configured to import a VPN-specific service model for a VPN service and map the VPN-specific service model to one or more TE-specific parameters. The CNC apparatus additionally includes means for storing information coupled to the processor and configured to store a mapping between a VPN ID of the VPN service and a tunnel ID of a TE tunnel established for the VPN service, where the TE tunnel satisfies the one or more TE-specific parameters.

A CNC apparatus includes means for processing configured to import a VPN-specific service model for a VPN service and map the VPN-specific service model to a service mapping policy that indicates whether TE tunnel sharing is allowed for the VPN service. The CNC apparatus further includes means for storing information coupled to the means for processing and configured to store a mapping between a VPN ID of the VPN service and a tunnel ID of a TE tunnel established for the VPN service according to the service mapping policy.

A central controller apparatus includes means for receiving information configured to receive a VPN-specific service model specifying one or more attributes for a VPN service. The central controller apparatus further includes means for processing coupled to the means for receiving information and configured to: obtain a mapping between the VPN-specific service model and one or more TE-specific parameters corresponding to the one or more attributes; determine, using the mapping, a TE tunnel that satisfies the one or more TE-specific parameters; and map the VPN service to the TE tunnel.

A central controller apparatus includes means for receiving information configured to receive a VPN-specific service model for a VPN service and a service mapping policy for the VPN service, where the service mapping policy indicates whether TE tunnel sharing is allowed for the VPN service. The central controller apparatus also includes means for processing coupled to the means for receiving information and configured to determine, according to the service mapping policy, a TE tunnel for the VPN service, and map the VPN service to the TE tunnel.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The following code is example code for a TE service mapping model, such as the TE service mapping model 202 of FIGS. 2 and 7.

```
module ietf-te-service-mapping {
    namespace "urn:ietf:params:xml:ns:yang:ietf-te-service-mapping";
    prefix "tm";
    import ieff-l3vpn-svc {
        prefix "l3";
    }
    import ieff-l2vpn-svc {
        prefix "l2";
    }
    import ietf-l1csm {
        prefix "l1";
    }
    import ietf-te {
        prefix "te";
    }
    import ietf-actn-vn {
        prefix "vn";
    }
    organization
        "IETF Traffic Engineering Architecture and Signaling (TEAS)
        Working Group";
    description
        "This module contains a YANG module for the mapping of
        service (e.g. L3VPN) to the TE tunnels or ACTN VN.";
    revision 2017-10-27 {
        description
            "initial version.";
        reference
            "TBD";
    }
    /*
     * Identities
     */
    identity service-type {
        description
            "Base identity from which specific service types are
            derived.";
    }
    identity l3vpn-service {
```

```
            base service-type;
            description
                    "L3VPN service type.";
        }
        identity l2vpn-service {
            base service-type;
            description
                    "L2VPN service type.";
        }
        identity l1vpn-service {
            base service-type;
            description
                    "L1VPN connectivity service type.";
        }
        /*
         * Enum
         */
        typedef map-type {
            type enumeration {
                enum "new" {
                    description
                        "The new VN/tunnels are binded to the service";
                }
                enum "select" {
                    description
                        "The VPN service selects an existing tunnel with no
modification";
                }
                enum "modify" {
                    description
                        "The VPN service selects an existing tunnel and allows
to modify the properties of the tunnel (e.g., b/w) ";
                }
            }
            description
                    "The map-type";
        }
        /*
         *Groupings
         */
        grouping service-ref{
            description
                    "The reference to the service.";
               choice service {
                    description
                        "The service";
                    case l3vpn {
                        leaf l3vpn-ref {
                            type leafref {
                                path "/l3:l3vpn-svc/l3:vpn-services/"
                                + "l3:vpn-service/l3:vpn-id";
                            }
                            description
                                "The reference to L3VPN Service YANG Model";
                        }
                    }
                    case l2vpn {
                        leaf l2vpn-ref {
                            type leafref {
                                path "/l2:l2vpn-svc/l2:vpn-services/"
                                + "l2:vpn-svc/l2:vpn-id";
                            }
                            description
                                "The reference to L2VPN Service YANG Model";
                        }
                    }
                    case l1vpn {
                        leaf l1vpn-ref {
                            type leafref {
                                path "/l1:l1cs/l1:service/"
                                + "l1:service-list/l1:subscriber-l1vc-id";
                            }
                            description
                                "The reference to L1VPN Service YANG Model";
                        }
                    }
               }
        }
        grouping site-ref {
```

```
                description
                    "The reference to the site.";
            choice service {
                description
                    "The service choice";
                case l3vpn {
                    leaf l3vpn-ref{
                        type leafref {
                            path "/l3:l3vpn-svc/l3:sites/l3:site/"
                              + "l3:site-id";
                        }
                        description
                            "The reference to L3VPN Service YANG Model";
                    }
                }
                case l2vpn {
                    leaf l2vpn-ref{
                        type leafref {
                            path "/l2:l2vpn-svc/l2:sites/l2:site/"
                              + "l2:site-id";
                        }
                        description
                            "The reference to L2VPN Service YANG Model";
                    }
                }
                case l1vpn {
                    leaf l1vpn-ref{
                        type leafref {
                            path "/l1:l1cs/l1:access/l1:uni-list/"
                              + "l1:UNI-ID";
                        }
                        description
                            "The reference to L1VPN Connectivity Service YANG
Model";
                    }
                }
            }
    }
    grouping te-ref {
        description
            "The reference to TE.";
        choice te {
            description
                "The TE";
            case actn-vn {
                leaf actn-vn-ref {
                    type leafref {
                        path "/vn:actn/vn:vn/vn:vn-list/vn:vn-id";
                    }
                    description
                        "The reference to ACTN VN";
                }
            }
            case te {
                leaf-list te-tunnel-list {
                    type te:tunnel-ref;
                    description
                        "Reference to TE Tunnels";
                }
            }
        }
    }
    grouping te-endpoint-ref {
        description
            "The reference to TE endpoints.";
        choice te {
            description
                "The TE";
            case actn-vn {
                leaf actn-vn-ref {
                    type leafref {
                        path "/vn:actn/vn:ap/vn:access-point-list"
                          + "/vn:access-point-id";
                    }
                    description
                        "The reference to ACTN VN";
                }
            }
            case te {
```

```
                    /*should we refer to Te-topology or Te-tunnel's
    endpoint(?)*/
                }
            }
        }
    }
    grouping service-mapping {
        description
            "Mapping between Services and TE";
        container service-mapping {
            description
                "Mapping between Services and TE";
            list mapping-list {
                key "map-id";
                description
                    "Mapping identified via a map-id";
                leaf map-id {
                    type uint32;
                    description
                        "a unique mapping identifier";
                }
                leaf map-type {
                    type map-type;
                    description
                        "Tunnel Bind or Tunnel Selection";
                }
                uses service-ref;
                uses te-ref;
            }
        }
    }
    grouping site-mapping {
        description
            "Mapping between VPN access site and TE
            endpoints or AP";
        container site-mapping {
            description
                "Mapping between VPN access site and TE
                endpoints or AP";
            list mapping-list {
                key "map-id";
                description
                    "Mapping identified via a map-id";
                leaf map-id {
                    type uint32;
                    description
                        "a unique mapping identifier";
                }
                uses site-ref;
                uses te-endpoint-ref;
            }
        }
    }
    /*
     * Configuration data nodes
     */
    container te-service-mapping {
        description
            "Mapping between Services and TE";
        uses service-mapping;
        uses site-mapping;
    }
}
```

The invention claimed is:

1. A customer network controller (CNC), comprising:

a processor configured to import a virtual private network (VPN)-specific service model for a VPN service and map the VPN-specific service model to one or more traffic engineering (TE)-specific parameters; and a memory coupled to the processor and configured to store a mapping between a VPN identification (ID) of the VPN service corresponding to the VPN-specific service model and a tunnel ID of a TE tunnel established for the VPN service, wherein the TE tunnel satisfies the one or more TE-specific parameters.

2. The CNC of claim 1, wherein the VPN-specific service model includes a layer three (L3) service model (SM).

3. The CNC of claim 1, wherein the one or more TE-specific parameters are parameters used in an abstraction and control of traffic engineered networks (ACTN) virtual network (VN) yet another next generation (YANG) model.

4. The CNC of claim 1, wherein the one or more TE-specific parameters are parameters used in a TE tunnel model.

5. The CNC of claim 1, wherein the processor is further configured to map the VPN service to a service mapping policy that indicates whether TE tunnel sharing is allowed for the VPN service, and wherein the CNC further comprises a transmitter configured to transmit the service mapping policy to a multi-domain service coordinator (MDSC) controller.

6. The CNC of claim 1, further comprising:
a transmitter coupled to the processor and configured to:
send the VPN-specific service model to a multi-domain service coordinator (MDSC) controller; and
send the one or more TE-specific parameters to the MDSC controller; and
a receiver coupled to the processor and configured to receive the TE tunnel ID from the MDSC controller.

7. A customer network controller (CNC), comprising:
a processor configured to import a virtual private network (VPN)-specific service model for a VPN service and map the VPN-specific service model to a service mapping policy that indicates whether traffic engineering (TE) tunnel sharing is allowed for the VPN service; and
a memory coupled to the processor and configured to store a mapping between a VPN identification (ID) of the VPN service corresponding to the VPN-specific service model and a tunnel ID of a TE tunnel established for the VPN service according to the service mapping policy.

8. The CNC of claim 7, further comprising:
a transmitter coupled to the processor and configured to transmit the service mapping policy to a multi-domain service coordinator (MDSC) controller; and
a receiver coupled to the processor and configured to receive the TE tunnel ID from the MDSC controller.

9. The CNC of claim 7, wherein the VPN-specific service model is a layer three (L3) service model (SM).

10. The CNC of claim 7, wherein the service mapping policy is selected from a plurality of modes including a first mode that requires a new TE tunnel that is not shared with any existing VPN services, a second mode that allows use of an existing TE tunnel that is shared with an existing VPN service and that does not allow for modification of the existing TE tunnel, and a third mode that allows for use of an existing tunnel that is shared with an existing VPN service and that allows for modification of the existing TE tunnel.

11. A central controller, comprising:
a receiver configured to receive a virtual private network (VPN)-specific service model specifying one or more attributes for a VPN service;
a processor coupled to the receiver and configured to:
obtain a mapping between the VPN-specific service model and one or more traffic engineering (TE)-specific parameters corresponding to the one or more attributes;
determine, using the mapping, a TE tunnel that satisfies the one or more TE-specific parameters; and
map the VPN service corresponding to the VPN-specific service model to the TE tunnel.

12. The central controller of claim 11, wherein the VPN-specific service model is a layer three (L3) service model (SM).

13. The central controller of claim 11, wherein the one or more TE-specific parameters are associated with an abstraction and control of traffic engineered networks (ACTN) virtual network (VN) yet another next generation (YANG) model.

14. The central controller of claim 11, wherein the mapping further indicates a service mapping policy for the VPN service, wherein the service mapping policy indicates whether the TE tunnel is allowed to be shared with an existing VPN service, and wherein the processor is further configured to set up the TE tunnel according to the service mapping policy.

15. The central controller of claim 11, further comprising a transmitter coupled to the processor, and wherein the processor is configured to interact with one or more packet provisioning network controllers (PNCs) and one or more transport PNCs via the receiver and the transmitter to create, in an IP/MPLS network, a provider edge (PE)-PE tunnel that is mapped to the TE tunnel in a transport network.

16. The central controller of claim 15, wherein the processor is configured to cause the transmitter to transmit inter-layer access points and tunnel requirements to the one or more IP controllers and the one or more transport network controllers.

17. The central controller of claim 15, wherein the processor is configured to cause the transmitter to send a TE model that is based on the VPN-specific service model to the one or more IP controllers, wherein the TE model specifies the one or more TE-specific parameters.

18. The central controller of claim 11, further comprising a memory coupled to the processor and configured to store a relation between a TE tunnel identification (ID) to an ID of the VPN service in a data structure.

19. A central controller, comprising:
a receiver configured to receive a virtual private network (VPN)-specific service model for a VPN service and a service mapping policy for the VPN service, wherein the service mapping policy indicates whether traffic engineering (TE) tunnel sharing is allowed for the VPN service; and
a processor coupled to the receiver and configured to:
determine, according to the service mapping policy, a TE tunnel for the VPN service; and
map the VPN service corresponding to the VPN-specific service model to the TE tunnel.

20. The central controller of claim 19, wherein the service mapping policy is selected from a plurality of modes including a first mode that requires a new TE tunnel that is not shared with any existing VPN services, a second mode that allows use of an existing TE tunnel that is shared with an existing VPN service and that does not allow for modification of the existing TE tunnel, and a third mode that allows for use of an existing tunnel that is shared with an existing VPN service and that allows for modification of the existing TE tunnel.

21. The central controller of claim 19, wherein the VPN-specific service model is a layer three (L3) service model (SM).

22. The central controller of claim 19, wherein the VPN-specific service model specifies attributes for the VPN service, wherein the service mapping policy indicates that TE tunnel sharing is allowed for the VPN service, and wherein the processor is further configured to search TE tunnel assignments to determine whether any established TE tunnels allow sharing and satisfy the attributes.

23. The central controller of claim 22, further comprising a transmitter, and wherein, responsive to determining that no established TE tunnels allow sharing and satisfy the attributes, the processor is configured to interact, via the receiver and the transmitter, with one or more provisioning network controllers (PNCs) using a TE tunnel model.

* * * * *